United States Patent
Nohara et al.

(10) Patent No.: US 6,800,227 B1
(45) Date of Patent: Oct. 5, 2004

(54) MATERIAL BEAD CHARGING METHOD, SYNTHETIC RESIN MOLD FOAM FORMING METHOD USING THIS METHOD, AND MOLD FOAM FORMED PRODUCT OBTAINED BY THIS METHOD

(75) Inventors: Iwao Nohara, Nakatsugawa (JP); Tomio Nakajima, Nakatsugawa (JP); Kiyotaka Ida, Nakatsugawa (JP); Masahiko Sameshima, Settsu (JP); Yoshiyuki Kobayashi, Nara (JP); Kenji Yamaguchi, Osaka (JP)

(73) Assignees: Daisen Industry Co., Ltd., Gifu (JP); Kaneka Corporation, Osaka (JP)

( * ) Notice: Subject to any disclaimer, the term of this patent is extended or adjusted under 35 U.S.C. 154(b) by 0 days.

(21) Appl. No.: 09/647,247
(22) PCT Filed: Mar. 31, 1999
(86) PCT No.: PCT/JP99/01710
§ 371 (c)(1),
(2), (4) Date: Nov. 22, 2000
(87) PCT Pub. No.: WO99/51415
PCT Pub. Date: Oct. 14, 1999

(30) Foreign Application Priority Data

Mar. 31, 1998 (JP) ............................................ 10-086266
Apr. 30, 1998 (JP) ............................................ 10-120165

(51) Int. Cl.$^7$ ................................................ B29C 44/02
(52) U.S. Cl. ........................................ 264/51; 264/126
(58) Field of Search ......................... 264/126, 45.4, 264/51, 53; 425/4 R

(56) References Cited

U.S. PATENT DOCUMENTS

| | | | | |
|---|---|---|---|---|
| 3,971,471 A | * | 7/1976 | Ludder | 206/519 |
| 4,627,946 A | * | 12/1986 | Crabtree | 264/51 |
| 4,818,451 A | * | 4/1989 | Arai et al. | 264/40.3 |
| 5,298,208 A | * | 3/1994 | Sibley et al. | 264/51 |
| 5,328,345 A | * | 7/1994 | Yamamoto et al. | 425/4 R |
| 5,858,288 A | * | 1/1999 | Bullard | 264/53 |
| 6,558,592 B1 | * | 5/2003 | Nohara et al. | 264/51 |

FOREIGN PATENT DOCUMENTS

| | | |
|---|---|---|
| JP | 53-51465 | 5/1978 |
| JP | 61-110534 | 5/1986 |
| JP | 61-140821 | 9/1986 |
| JP | 61-162430 | 10/1986 |
| JP | 1-171841 | 7/1989 |
| JP | WO 92/02358 | 2/1992 |

* cited by examiner

Primary Examiner—Allan R. Kuhns
(74) Attorney, Agent, or Firm—Westerman, Hattori Daniels & Adrian LLP

(57) ABSTRACT

Using a new molded foaming apparatus wherein chambers 13 and 14, independent from a cavity 4, are formed at the rear sides of a set of dies 2 and 3 for molding a molded foam product, so as to supply such utility fluid as air and steam to the cavity 4 through first openings 30 independently from the chambers 13 and 14, various problems created when forming vent holes are fundamentally solved, and at the same time dispersion of filling density to be caused by not forming vent holes is prevented by supplying the material beads to the cavity 4 while maintaining the pressure in the cavity 4 at a predetermined minus pressure with respect to the pressure in the material tank using the first openings 30.

13 Claims, 13 Drawing Sheets

(a)

(b)

MATERIAL BEAD CHARGING METHOD, SYNTHETIC RESIN MOLD FOAM FORMING METHOD USING THIS METHOD, AND MOLD FOAM FORMED PRODUCT OBTAINED BY THIS METHOD

BACKGROUND OF THE INVENTION

1. Field of the Invention

The present invention relates to a method for filling material beads, a method for die-expanded molded foaming of synthetic resin using the above method, and a die-expanded molded foam product obtained thereby, in a die-expanded molded foaming apparatus which molds molded foam products using material beads made of thermoplastic synthetic resin, such as polyolefine and polystyrene.

2. Description of the Related Art

As a die-expanded molded foaming apparatus for manufacturing molded foam products using material beads made of thermoplastic synthetic resin, an apparatus shown in FIG. 11 has been commercialized, wherein a set of dies 100 and 101 are disposed opposite each other, chambers 102 and 103 are disposed at the rear side of the dies 100 and 101 respectively, many vent holes 105 and 106 connecting the chambers 102 and 103 and a cavity 104 are formed in both of the dies 100 and 101, and utility fluid, such as the later mentioned heating steam, is supplied to the cavity 104 or is exhausted from the cavity 104 through the vent holes 105 and 106. In the structure of this case, upper utility ports 107 and 108 for supplying heating steam are disposed at the upper part of the respective chambers 102 and 103, and lower utility ports 109 and 110 connected to a pressure reducing pump or a drain pipe are disposed at the lower part of the respective chambers 102 and 103 so that steam is supplied to the cavity 104.

For actually forming the many vent holes 105 and 106 opened in the dies 100 and 101, a core vent 111, which is a cylindrical body with a cap having an outer diameter of 7~12 mm where a plurality of vent holes 105 and 106, which are approximately 0.5 mm$\phi$ round holes or approximately 0.5 mm width slits, are opened, is embedded in the respective core vent attachment holes 112, which are opened at a 20~50 mm pitch in the dies 100 and 101, as illustrated in FIG. 12 and FIG. 13.

In order to mold a molded foam body using such a molded foaming apparatus, preexpanded material beads made of thermoplastic synthetic resin, such as polyolefine and polystyrene, are supplied from a material tank (not illustrated) and filled into the cavity 1 via a filling unit 113, are heated with the heating steam for foaming and fusing, are cooled and solidified, and then are taken out as a molded foam body.

Widely used methods for filling the material beads are 1) a cracking method, 2) a pressure filling method, and 3) a compression filing method, and these methods will be briefly described first.

1) The cracking method is a method for filling material beads by mechanically supplying the mechanical beads using an injector in a state where the material tank and the cavity are opened to atmospheric pressure, and has a disadvantage that air remaining inside is apt to cause filling unevenness, and increase the dispersion of filling density.

2) The pressure filling method is a method for filling the material beads by pressurizing inside the material tank to 0.2~1.5 kg/cm$^2$, and supplying and filling the material beads into the cavity, which is opened to atmospheric pressure, through the chamber using the differential pressure. In this case, filling unevenness is less than the above mentioned cracking method, since differential pressure in the carrier passage from the material tank to the cavity can be utilized.

3) The compression filling method is a method for supplying and filling material beads by pressurizing the pressure P inside the material tank to 1.0~5.0 kg/cm$^2$, slightly higher than the pressure filling method, and pressurizing one chamber so as to change the differential pressure (P–P1) with the pressure P1 inside the cavity connected thereto via vent holes, and the filling property is good since the material beads are supplied in a compressed state.

Now, a method for heating, expanding and fusing the material beads, which are filled in the cavity as mentioned above, will be examined. As a heating expansion method for the material beads, a method stated in the Japanese Patent Laid-Open No. 57-174223 has been generally used. In this publication, the process drawing shown in FIG. 14 is included, wherein (a)~(d) depict the preheat exhausting process for substituting air in the dies and air among the material beads with steam, and the concrete content of each process will be explained below. In FIG. 14, a black valve symbol indicates that the valve is closed, and a white valve symbol indicates that the valve is open.

(a) is an exhaust process, wherein after the material beads are filled in the cavity 104, steam is supplied from the top utility ports 107 and 108 to the chambers 102 and 103 for a very short time, and at the same time, air in the dies, particularly in the chambers 102 and 103, is exhausted from the bottom utility ports 109 and 110 by suction. In this case, pressure inside the chambers 102 and 103 is increased to be a plus pressure by steam so that steam enters among the material beads through the vent holes 105 and 106.

(b) is a both-side exhaust process, wherein the top utility ports 107 and 108 are closed, and the vacuuming and pressure reducing operation is continued to reduce pressure inside the dies so that air existing in spaces among the material beads is sucked and exhausted through the vent holes 105 and 106 formed in the dies on both sides.

(c) is a one-side preheating process, wherein the bottom utility ports 109 and 110 are closed and steam is supplied from the top utility port 108 of one chamber 103, which is in a pressure-reduced state, for a short time. In this case, the supplied steam passes sequentially through the vent hole 106 of the die 101, among the material beads in the cavity 104, and the vent hole 105 of the die 100, and flows into the chamber 102 at the opposite side, by which all of the material beads and the dies 100 and 101 are preheated.

(d) is a one-side preheating process with an opposite flow of steam, wherein a similar operation is carried out from the chamber 102 side so that air in the cavity 104 is completely exhausted, and at the same time, both dies 100 and 101 are preheated while decreasing the localized temperature difference as much as possible.

(e) is a heating process for fusion, wherein steam for heating for fusion is supplied to both of the chambers 102 and 103 for heating the dies 100 and 101, and for heating the materials beads as well through the vent holes 105 and 106 of the respective dies 100 and 101, so as to complete foaming, and to mutually fuse the material beads to form the molded foam body.

In the case of the above mentioned molding method, wherein such a utility fluid as air and steam is supplied to the cavity or is exhausted from the cavity, the vent holes are indispensable, but forming vent holes will cause the following problems.

(1) In order to compensate for strength which is decreased by opening many core vent attachment holes in the dies, the wall thickness of a die made of aluminum alloy material must be set thick, 8~12 mm for example, which increases heat capacity, causing such problems as poor heat efficiency for heating and cooling, or a slow speed of temperature rising and lowering, which drops control accuracy.

(2) Since 2000~4000 core vent attachment holes are opened in a general pair of dies, a complicated drilling operation increases processing cost, and since the core vents are attached manually, this operation is complicated, causing inevitable damage on the surface of the dies, where an extra operation for repair is necessary.

(3) Vent holes are clogged by e.g. scales, causing heat failure, mold releasing failure, and cooling failure, which makes a maintenance operation necessary, such as replacing core vents or periodic cleaning by high pressure cleaning water.

(4) Traces of core vents and vent holes remain on the surface of the molded foam product, which causes a drop in the beauty of the appearance of the molded foam product, and when the outer surface is printed, traces of core vents and vent holes become the cause of dropping printing quality.

(5) After molding, the molded foam product is cooled down by spraying cooling water into the chambers, and at this time moisture infiltrates into the cavity through the vent holes, resulting in the molded foam product containing 6~10% water inside, which makes a drying process necessary. Also the cooling water must be controlled to be a clean state to obtain a clean molded foam product, since the cooling water directly contacts the molded foam product.

(6) Since the material beads are heated for expanding and fusing under the same heating conditions by supplying steam from the chambers to the cavity, the surface property of the molded foam product obtained like this (hereafter equal heating molded foam product) changes depending on the fusion rate of the beads. Concretely, the surface property worsens as the fusion rate decreases, and surface property improves as the fusion rate increases. On the other hand, the higher the fusion rate of the beads is set for an equal heating molded foam product, the better properties become, such as the mechanical strength of the molded foam product, but heating, expanding and fusing time, and cooling time become longer, which makes the general cycle time of molding longer, decreasing productivity.

For the above reasons, in the above mentioned molding technology, the fusion rate of beads of a molded foam product is set to e.g. 40~80% so as to improve surface property to insure beauty in appearance and to insure mechanical strength by setting a sufficiently high fusion rate, however the fusion rate must be set high enough to insure beauty in appearance even for a molded foam product which does not demand high mechanical strength, therefore cycle time for molding increases and productivity decreases. The fusion rate here is based on an evaluation of the state of beads in a cross-section when the molded foam product is split, and more concretely, the ratio of broken beads determined by measurement, regarding a bead as not fused when the bead itself is not broken but has a crack along its surface, and regarding a bead as fused when the bead itself is broken.

As described above, in conventional molded foaming methods, where such a utility fluid as steam and air is supplied to the cavity or is exhausted from the cavity using the vent holes to obtain a molded foam product, forming the vent holes cause the many problems mentioned above.

To completely solve these problems, the present inventors examined practical methods for molded foaming using dies without the vent holes, and conducted various tests. Even if the vent holes are not formed in the dies, passages which substitute for the vent holes are indispensable for supplying or exhausting such utility fluid as steam and air to/from the cavity, so there are many problems including where and how such passages are to be formed and at which timing and under what conditions the utility fluid is to be supplied to these passages.

One of such problems is a problem concerning a method for filling the material beads to the cavity.

When the above mentioned cracking method is used, material beads can be supplied up to a point by leaving some space open in the set of the dies without being completely closed, but filling is so uneven that it is impossible to apply this method for practical use.

In the case of the pressure filling method, which can maintain the inside of the cavity to atmospheric pressure by leaving some space open in the set of the dies, filling operation is possible up to a point, but the filled material beads are compressed for the closing dimensions corresponding to cracking after the filling operation, so when a box shaped molded foam product which top face is open is manufactured, for example, compressibility differs between the plane portion to be the bottom of the molded foam product and the portion to be the side wall, where the filling factor is greater in the plane portion than in the side wall portion, still causing filling density unevenness.

In the case of the compression filling method, the inside of the cavity must be maintained to be a predetermined pressure, which is atmospheric pressure or higher, however we cannot compare and examine this method since there is no means for supplying the material beads with dies which have no vent holes while maintaining pressurization.

It is an object of the present invention to commercialize a new molded foaming apparatus where the vent holes are not formed in the die faces, and to provide a method for filling the material beads which can minimize filling unevenness during filling the material beads, which is one of the problems of the molded foaming apparatus having no vent holes, a method for die-expanded molded foaming of synthetic resin using the filling method, and to provide a die-expanded molded foam product obtained thereby.

SUMMARY OF THE INVENTION

A method for filling material beads according to a first aspect of the present invention is a method for filling the material beads from a material tank to a cavity comprised of a set of dies, wherein the cavity is formed enclosed with a pair of dies with chambers disposed on the rear side respectively, and is air tightly isolated from the chambers, then the material beads are supplied to the cavity while maintaining the pressure in the cavity at a predetermined minus pressure with respect to the pressure in the material tank.

In the case of the filling method according to the first aspect, the chambers and the cavity are air tightly isolated, that is, the molded foaming apparatus to be used does not have vent holes for connecting the chambers and the cavity in the dies, therefore the above mentioned problems caused when forming vent holes can be fundamentally solved. Filling the material beads, which utilizes differential pressure between the material tank and the cavity, can be easily carried out by adjusting the pressure of the material tank and the cavity.

The filling method according to the second aspect is that the material beads are supplied to the cavity while maintaining the pressure in the above mentioned material tank in an atmospheric pressure ~5.0 kg/cm² range. This configuration is preferable since filling density becomes relatively uniform in the plane portions, the side face portions or even in the narrow portions of the cavity, by compressing and decreasing the capacity of the material beads in the cavity to be an optimum outer diameter (capacity).

A filling method according to a third aspect is that the pressure in the cavity is maintained to be a pressurized state which is less than minus 0.5 kg/cm² with respect to the pressure in the material tank and the atmospheric temperature or more. It is preferable to set to this range because in a pressure state outside this range, the flow velocity of the carrier air flow becomes excessive, and clogging of the material beads occurs in the cavity or in a narrow portion of the filling passage.

A filling method according to a fourth aspect is that the pressure in the cavity is maintained to be a reduced pressure state which is from atmospheric pressure to a minus 1.0 kg/cm² range. In this case, the pressure in only the cavity is reduced for the material beads which do not need compression and decreasing capacity, which is preferable because a negative pressure state is easily maintained during filling, and filling density becomes uniform in the plane portions or the side face portions or even in the narrow portions of the cavity.

After considering claims 1 to 4 in general, it is preferable to set the pressure in the cavity in a minus 1.0~5.0 kg/cm² range, which is a fifth aspect.

A method for die-expanded molded foaming of synthetic resin according to a sixth aspect is a method for die-expanded molded foaming of synthetic resin comprising the steps of: filling material beads in a cavity for molded foaming enclosed with a pair of dies with chambers disposed on the rear side respectively; heating, expanding and fusing the material beads to be a molded foam body; and cooling, releasing and taking out the molded foam body from the dies, wherein the following processes are included.

a) A die closing process where the dies are closed to form the cavity air tightly isolated from the chambers and to form utility passages directly connected to the cavity.

b) A filling process where the material beads are supplied and filled into the cavity from the material tank by the method for filling material beads according to one of the first to fifth aspects, and at the same time heating steam is supplied to the chambers so as to heat the entire dies around the chambers to a temperature where the material beads do not expand.

c) An internal heating process where heating steam having a temperature less than the fusing temperature of the material beads is supplied to the cavity through the utility passages for the cavity so as to heat the filled material beads, and at the same time, condensed water is generated on the faces of the dies enclosing the cavity.

d) A fusion heating process where heating steam having a temperature at the fusion temperature of the material beads or higher is supplied to the chamber so as to evaporate the condensed water in the cavity and to progress the expansion and fusion of the material beads.

According to this molded foaming method, just like the filling method in accordance with the first aspect, the chambers and the cavity are air tightly isolated, that is, the molded foaming apparatus to be used does not have vent holes for connecting the chambers and the cavity in the dies, and steam and air are supplied to or exhausted from the cavity, not through vent holes but through utility passages directly connected to the cavity, therefore the above mentioned problems caused when forming the vent holes can be fundamentally solved by the setting of the utility passages.

Since the material beads are filled by a filling method according to one of the first to fifth aspects in the filling process, filling can easily be uniform by adjusting the pressure of the material tank and the cavity.

Also the utility fluid can be supplied to the cavity and the chambers independently, therefore preheating of the dies can be operated by supplying heating steam to the chambers separately from the filling operation. In other words, it is preferable to preheat the dies, entered from the closing process to the filling process, preparing for the expansion operation in the after process, even when molding is continuously performed because time has passed since the last heating operation and temperature of the dies has considerably dropped, but in a conventional filling process, where air for filling the material beads is exhausted from the cavity via the chambers, the dies cannot be preheated in this filling process stage. Whereas in the present invention, where the exhaust passage for air for filling is independent from the chambers, preheating for the dies can be operated in parallel by supplying heating steam to the chambers separately from the filling operation.

A method for die-expanded molded foaming according to a seventh aspect is that in the die closing process, a die-expanded molded foaming apparatus is used, where slit shaped openings opening to the cavity and/or openings opening to the cavity near an accessory part to be attached at least to one of the dies are formed along the joint of the dies to be the opening width which is an outer diameter size or less of a material bead to be filled, and at the same time, connecting passages connecting the openings to external utility pipes are disposed.

By using such a die-expanded molded foaming apparatus, core vent attachment holes can be completely eliminated, manufacturing cost can be decreased by constituting the dies thin, and control accuracy of such utility fluid as steam can be controlled. Since operation for forming the core vent attachment holes and operation for attaching the core vents are decreased or eliminated, productivity of the dies can be improved, and maintenance operation required for clogging of the vent holes by scales can be decreased or eliminated. The openings formed at such positions do not drop beauty in appearance of the molded foam product, and such utility fluid as steam can be evenly supplied to the cavity.

The method for die-expanded molded foaming according to an eighth aspect is that the above mentioned accessory part is a filling unit of material beads. Since traces of the end face of the filling unit always remain on the surface of the molded foam product, the openings are formed near the filing unit so that traces of the openings are not outstanding, and a drop in appearance of the molded foam product is prevented.

The method for die-expanded molded foaming according to a ninth aspect is that a returning-to-atmosphere process for releasing the inside of the cavity from the pressurized state to an atmospheric pressure state or an exhaust process for reducing the pressure inside the cavity to exhaust internal air is added between the filling process and the internal heating process.

If the returning-to-atmosphere process is added like this, the material bead particles which have been pressurized and compressed expand as pressure is reduced and fill the mutual spaces, therefore the percentage of void decreases from 40% to 5~20%, decreasing the residual air content in voids among particles which will be a problem during fusion in the after process, and as a result uniformity inside the molded foam body improves. If the exhaust process is added, the pressure inside the cavity is reduced by actively exhausting air inside, and the percentage of void and residual air content can be decreased, and as a result uniformity inside the molded foam body improves, just like the returning-to-atmosphere process.

A method for die-expanded molded foaming according to a tenth aspect is that heating conditions for a pair of chambers and a cavity are controlled in a state where material beads made of thermoplastic synthetic resin are filled in the cavity by the filling method according to one of the first to fifth aspects, and the material beads filled in the cavity are heated, expanded and fused while controlling the internal fusion rate at will with maintaining the surface property of the molded foam product.

According to this molding method, wherein supply steam to the pair of chambers and cavity are supplied independently and the heating conditions for respective spaces are adjusted independently, the surface property of the material beads filled in the cavity contacting the dies can be adjusted respectively using the steam to be supplied to the pair of chambers, and the fusion rate of the material beads can be adjusted independently from the surface property by heating, expanding and fusing the material beads filled in the cavity using steam to be supplied to the cavity. This makes it possible to decrease the cycle time of molding while keeping the internal fusion rate of the molded foam product low, and to manufacture molded foam products with a beautiful surface as well, and consequently both productivity and commercial value can be implemented.

Since the chambers and cavity are formed in an air tightly isolated state, heating conditions for these three spaces can be more accurately set, and the above mentioned problems caused when forming the vent holes can be fundamentally solved. Vent holes connecting the cavity and the chambers may be formed only if the vent holes do not have a negative influence on control of the utility fluid. If the vent holes are formed in the core die and/or the cavity die, traces of the vent holes remain in the molded foam product, so it is preferable to form the vent holes such that the traces come to a location not outstanding in the molded foam product.

The method for die-expanded molded foaming according to an eleventh aspect is that the internal fusion rate is controlled at will with maintaining the surface property of the molded foam product, while independently controlling the heating conditions for the pair of chambers and the cavity. The pair of chambers may be controlled together, but it is preferable to control the respective chambers independently since the surface property of a surface at the core die side and the surface property of a surface at the cavity die side of the molded foam product can be controlled independently.

The method for die-expanded molded foaming according to a twelfth aspect is that the steam pressure and the time are controlled as heating conditions. It is also possible to control the steam temperature as a heating condition, but controlling the steam pressure and the time is preferable, since conventional steam equipment which has been used at a factory can be used, and equipment for control can be constructed at low cost.

The method for die-expanded molded foaming according to a thirteenth aspect is that the material beads are polyolefine synthetic resin material. Polyolefine synthetic resin material is preferable in terms of easy filling of the material beads even in a narrow portion, because the raw material itself is soft and has high gas permeability, which makes it much easier to change the shape of particles than material beads made of polystyrene synthetic resin material having the same expansion ratio.

A die-expanded molded foam product according to a fourteenth aspect is a molded foam product which is molded using material beads made of thermoplastic synthetic resin and has a beautiful surface free from traces of core vents and core vent holes. Such molded foam products with a beautiful surface free from traces of core vents and core vent holes are preferable since clean printing is possible on the outer surface. Such molded foam products can be easily manufactured by a molded foaming method according to one of the tenth~thirteenth aspects.

The die-expanded molded foam product according to a fifteenth aspect is that the internal fusion rate is lower than an equal heating molded foam product, having the same surface property setting, obtained by heating the surface and the inside under the same heating conditions. Such a molded foam product can decrease heating, expanding and fusion time during the molding and the cooling time, and can improve productivity by decreasing the cycle time for molding, since the internal fusion rate is lower than an equal heating molded foam product having the same surface property setting. Also both productivity and commercial value can be implemented since the surface property can be sufficiently maintained while setting the internal fusion rate low, without dropping commercial value.

The die-expanded molded foam product according to a sixteenth aspect is that the internal fusion rate is higher than an equal heating molded foam product, having the same surface property setting, obtained by heating the surface and the inside under the same heating conditions. Such a molded foam product has higher mechanical strength since the internal fusion rate is higher than an equal heating molded foam product having the same surface property setting, and is suitable when the surface property of the molded foam product is not a major requirement but only strength is demanded. In other words, such a molded foam product has higher mechanical strength since the internal fusion rate is higher than an equal heating molded foam product having the same surface property setting, and when this molded foam product is manufactured by a molding method according to the first aspect, heating steam pressure in the heating process can be set high only for the molding space formed by the cavity die and the core die, and therefore the amount of steam to be used is less than the case of molding an equal heating molded foam product, and energy can be saved.

BRIEF DESCRIPTION OF THE DRAWINGS

FIGS. 11~14 are drawings related to prior art, wherein FIG. 11 is a general structural drawing of a die-expanded molded foaming apparatus, FIG. 12 is a longitudinal section of an area near a core vent, FIG. 13 is a plan view of core vents, and FIG. 14 is a drawing depicting a method for molding a molded foam body.

DESCRIPTION OF THE PREFERRED EMBODIMENTS

Embodiments of the present invention will now be described with reference to the accompanying drawings.

Figure 1:
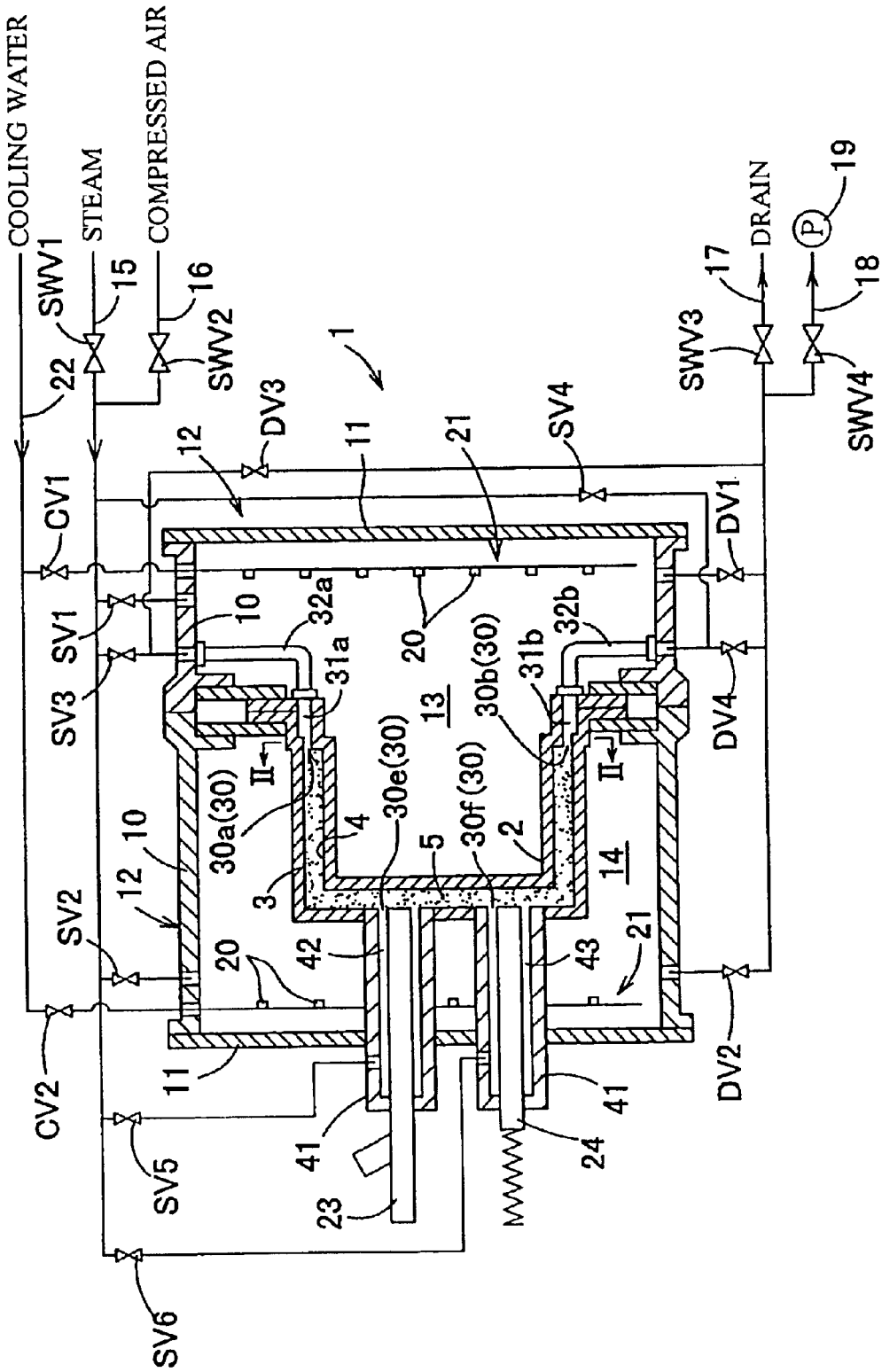
FIG. 1 is a general structural drawing of a die-expanded molded foaming apparatus.
Figure 2:
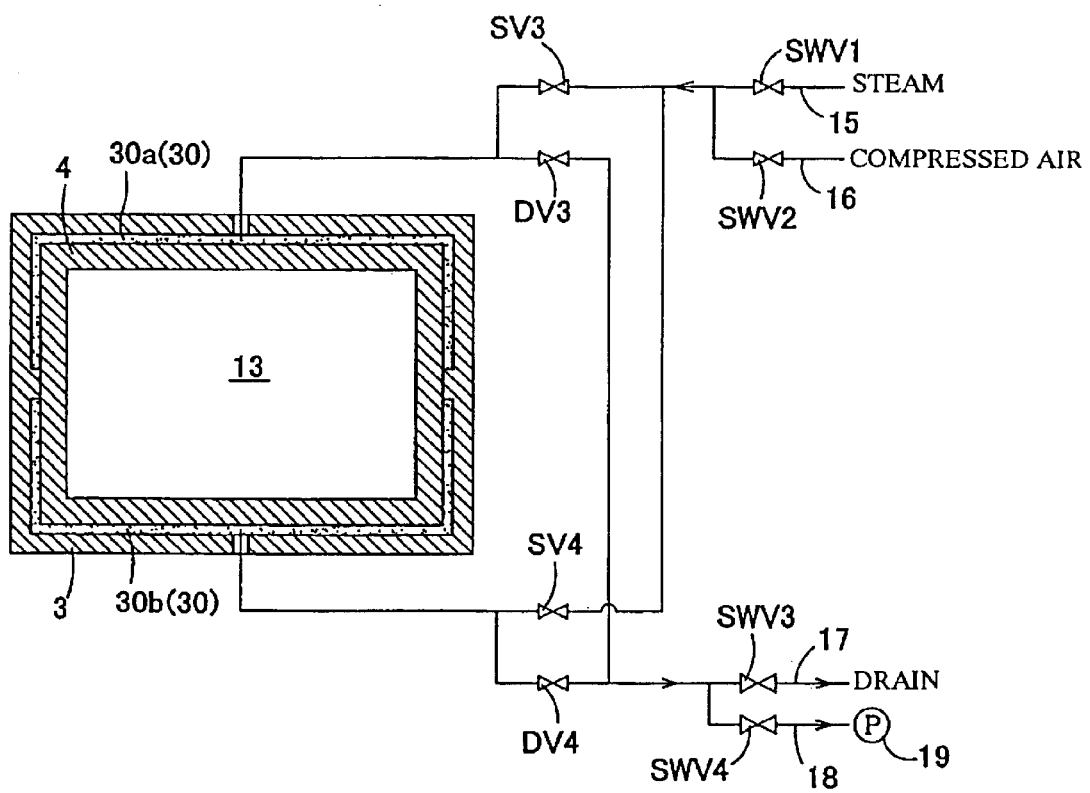
FIG. 2 is a II—II cross-sectional view of FIG. 1.

As FIG. 1 and FIG. 2 show, a die-expanded molded foaming apparatus 1 comprises a core die 2 and a cavity die 3, which are a set of dies disposed opposite each other, beads filling means for filling material beads 5 into a cavity 4, which is formed by the core die 2 and cavity 3, by air flow, pressure reducing means for reducing pressure inside the cavity 4, compressed air supply means for supplying compressed air into the cavity 4, steam supply means for heating the material beads 5 filled in the cavity 4 by steam and expanding and fusing the material beads, and cooling means for cooling the molded foam product.

As a raw material of the material beads 5, a raw material having characteristics suitable for e.g. the working conditions of the molded foam product to be manufactured is selected, where polystyrene synthetic resin material, polyolefine synthetic resin materials, such as polyethylene and polypropylene, and a copolymer of these synthetic resin materials can be used.

The expansion ratio of the material beads 5 is preferably in a range of 3~150 times, although this depends on the raw material of the material beads 5. Concretely, in the case of the material beads made of polystyrene synthetic resin material, 3~100 times, more preferably 3~80 times, is suitable, and in the case of the material beads made of polyolefine synthetic resin material, 3~90 times, more preferably 3~60 times, is suitable. For particle size, 1~10 mm, more preferably a 2.0~8 mm, is suitable. Material beads made of polyolefine synthetic resin material, in particular, are preferable in terms of improving filling property, because the raw material itself is soft and has high gas permeability, which makes it much easier to change the shape of particles than material beads made of polystyrene synthetic resin material having the same expansion ratio.

The core die 2 and the cavity die 3 are respectively attached to a housing 12 having a frame 10 and a backboard 11, and a set of a first chamber 13 and a second chamber 14 are formed on the rear side of the core die 2 and the cavity die 3 respectively.

The first chamber 13 and the second chamber 14 are connected to a steam supply pipe 15 and an air supply pipe 16 respectively via utility valves SV1 and SV2 and switching valves SWV1 and SWV2, and at the same time, are connected to a drain pipe 17 and a pressure reducing pipe 18 with a vacuum pump 19 respectively via drain valves DV1 and DV2 and switching valves SWV3 and SWV4. In the first and second chambers 13 and 14, a nozzle unit 21 having a plurality of nozzles 20 for spraying cooling water to the rear faces of the core die 2 and cavity die 3 is disposed respectively, and both of the nozzle units 21 are connected to a cooling water supply pipe 22 via cooling water valves CV1 and CV2.

In the molded foaming apparatus 1, first openings 30 are formed instead of conventional vent holes, and connecting passages for connecting the first openings 30 to external utility pipes 15~18 respectively are formed, so as to supply or exhaust such utility fluid as steam and compressed air from the first openings 30 to the cavity 4 independently from the chambers 13 and 14 by operating the utility values SV3~SV6, drain valves DV3 and DV4, and switching valves SWV1~SWV4.

The position for forming the first openings 30 can basically be classified into three types: forming at or near the joint of the core die 2 and the cavity die 3, forming near a portion of accessory parts, such as a filling unit 23 and an ejector pin 24, exposed to the cavity 4, and a combination of the above two types.

First the type forming the first openings 30 at or near the joint of the core die 2 and the cavity die 3 will be explained using three types of examples.

(1) In the first type die-expanded molded foaming apparatus 1, as shown in FIG. 1 and FIG. 2, the slit shaped first openings 30a and 30b opening to the cavity 4 are disposed along the joint portion of the core die 2 and the cavity die 3, and inter-die passages 31a and 31b and internal pipes 32a and 32b are disposed as connecting passages for connecting the first openings 30a and 30b and the external utility pipes 15~18, wherein no conventional vent holes are formed in the core die 2 and the cavity die 3, so that the cavity 4 is air-tightly isolated from both of the chambers 13 and 14 when the dies are closed, and at the same time, the first openings 30a and 30b which lead to the external utility pipes 15~18 are formed between the core die 2 and the cavity die 3. It is most preferable to air-tightly isolate the cavity 4 from both chambers 13 and 14 in this manner, but forming a small number of conventional vent holes connecting the cavity 4 and both of the chambers 13 and 14 is also embraced in the present invention.

In accordance with the above configuration, the above mentioned preheating and exhausting process and fusion heating process for the material beads 5 can be carried out in the following procedure using these first openings 30a and 30b, rather than conventional vent holes.

In the preheating and exhausting process, pressure inside the cavity 4 is directly reduced by reducing pressure and exhausting from the first opening 30a or the first opening 30b, then steam for preheating is directly supplied to the cavity 4 in the same manner, and in the fusion heating process, steam at fusing temperature is directly supplied from the first opening 30a or the first opening 30b to the material beads 5 in the cavity 4.

In order to prevent clogging of the first openings 30a and 30b by the material beads 5, the width of the opening of the first openings 30a and 30b at the cavity 4 side must be formed to be the size of the outer diameter of a material bead 5 to be filled, which is 1~10 mmφ, or less, and in order to finish the molded foam body nicely without flashes and burrs, the width of the opening should be as small as possible, but if the width of the opening is too small, the passing resistance of the utility fluid increases, so consequently 0.1~0.5 mm is suitable for the opening width.

In the present invention, it is suitable to dispose the first openings 30a and 30b at the joint of the core die 2 and the cavity die 3 along the base portion of the concave part. In this case, the slit shaped first openings 30a and 30b come to the convex ridge line part at the peripheral of the molded foam body, so appearance is not affected even if small flashes remain.

For the internal pipes 32a and 32b, using copper pipes with 4~15 mmϕ is appropriate.

FIG. 1 shows two sets of connecting passages, that is, a single connecting passage comprised of the first opening 30a, the inter-die passage 31a and the internal pipe 32a, and another single connecting passage comprised of the first opening 30b, the inter-die passage 31b and the internal pipe 32b, but the present invention is not restricted by this aspect, and three or more sets, or a single set can be used according to the shape and size of the molded foam body to be obtained.

When a plurality of the first openings 30 are formed, a pair of the first openings 30a and 30b, for example, it is preferable to dispose the openings opposite each other at the joint of the dies 2 and 3 located on the opposite sides at both opposing ends of the cavity 4. The length of the first openings 30a and 30b is not especially restricted, but this configuration is preferable because the utility fluid, such as steam, can be supplied from one of the first openings to the other first opening via the cavity 4, and particularly, operation for substituting air among the material beads 5 filled in the cavity 4 with steam, or operation for heating the material beads 5, can be carried out quickly.

The advantages of the first type are summarized as follows.

(1) Since a large number of core vent attachment holes, such as a conventional type, do not have to be formed in the dies 2 and 3, strength does not drop, the 8~12 mm wall thickness of a conventional aluminum alloy die can be decreased to a 4~8 mm wall thickness, and as a result, heat capacity decreases, heat efficiency for heating/cooling improves, temperature control accuracy improves, and material cost can be decreased.

(2) Since drilling of core vent attachment holes and core vent attachment operations are unnecessary, processing cost can be considerably decreased, and manufacturing cost for the dies 2 and 3 can be decreased.

(3) Since a heating failure, mold releasing failure and cooling failure caused by clogging do not occur, such maintenance operations as replacing core vents or periodic cleaning by high pressure cleaning water is completely unnecessary.

(4) Since traces of core vents and vent holes do not remain on the surface of the product, appearance quality improves and problems with surface printing and seal labeling processes are solved.

(5) Since cooling water used in the cooling process does not enter the cavity, moisture content in the molded foam product decreases from the conventional 6~10% to 0.5~4%, which makes a drying process unnecessary, and largely contributes to decreasing cycle time.

(6) The biggest advantage of the present invention is that the utility operation, which could not be implemented with conventional dies, is possible. For such a utility fluid as steam to act on the material beads 5, conventionally the utility fluid supplied from the utility pipes act on one of the chambers, then act on the material beads via the vent holes, whereas in this invention, where utility passages for the cavity 4 are separated and are independent from the chambers 13 and 14, such utility fluid as pressurizing air, steam, pressure reducing air and cooling water, directly act in the cavity 4 via the first openings 30a and 30b, therefore the flexibility of the utility operation expands.

When pressure in the cavity 4 is to be decreased, for example, pressure of both chambers must be reduced as well in the case of conventional dies, but in accordance with the present invention, it is possible to carry out the pressure reducing operation only for the cavity 4, which capacity is 1/10 that of the chamber. Since response is quicker than a conventional type, operability is considerably improved.

Since the chambers 13 and 14 are constituted in a space independent from the cavity 4, and heating conditions for each space can be adjusted independently, the temperature of the set of the dies 2 and 3 can be adjusted independently for each die by steam to be supplied to the two chambers 13 and 14 so as to adjust the surface property of the molded foam product contacting the dies 2 and 3, and the material beads filled in the cavity 4 are heated, expanded and fused by steam to be supplied to the cavity 4, so as to adjust the fusion rate of the material beads 5 independently from the surface property. This makes it possible to manufacture molded foam products with a beautiful surface while keeping the internal fusion rate of the molded foam product low to decrease the cycle time of molding, and as a result, both productivity and commercial value can be implemented.

Figure 3:
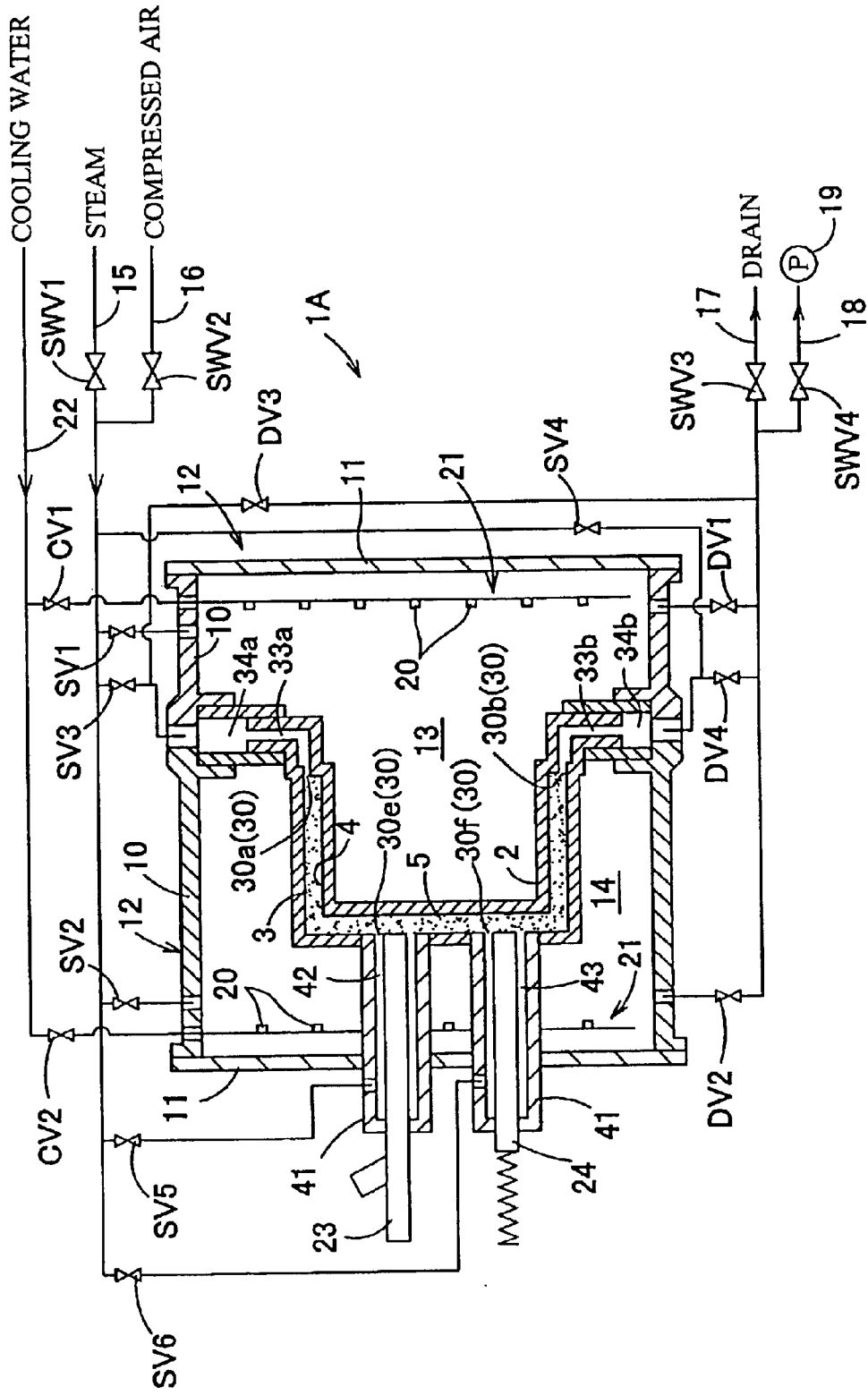
FIG. 3 is a general structural drawing of a die-expanded molded foaming apparatus having another configuration.

(2) In the second type die-expanded molded foaming apparatus 1A, as connecting passages connecting the slit shaped first openings 30a and 30b to the external utility pipes 15~18, inter-die passages 33a and 33b are formed along the joint portion of the dies 2 and 3 from the cavity 4 side to the outside, and inter-die spaces 34a and 34b are formed surrounded by the joint portion of the frames 10 when the dies are closed, as shown in FIG. 3. Since the other structure is the same as the die-expanded molded foaming apparatus 1, identical parts are denoted by the same reference characters for which a detailed description is omitted.

In the die-expanded molded foam apparatus 1A, conventional vent holes are not formed in the dies 2 and 3, and when the dies are closed, the cavity 4 is formed air-tightly isolated from both chambers 13 and 14, and the first openings 30a and 30b and the connecting passages for connecting these first openings 30a and 30b to the utility pipes 15~18, that is, inter-die passages 33a and 33b and inter-die spaces 34a and 34b, are formed along the joint of both dies 2 and 3 and the frame from the cavity 4 side to the outside, in a mode which is different from the first type die-expanded molded foaming apparatus 1.

In accordance with the molded foaming apparatus 1A shown in FIG. 3, the utility fluid can be operated during molding, just like the die-expanded molded foaming apparatus 1, therefore all the above mentioned advantages, (1)~(6), are also available here, and in addition, independent internal pipes 32a and 32b, which would require piping working at manufacturing, are unnecessary, therefore manufacturing cost of the molded foaming apparatus is decreased and maintenance is also unnecessary.

Figure 4:
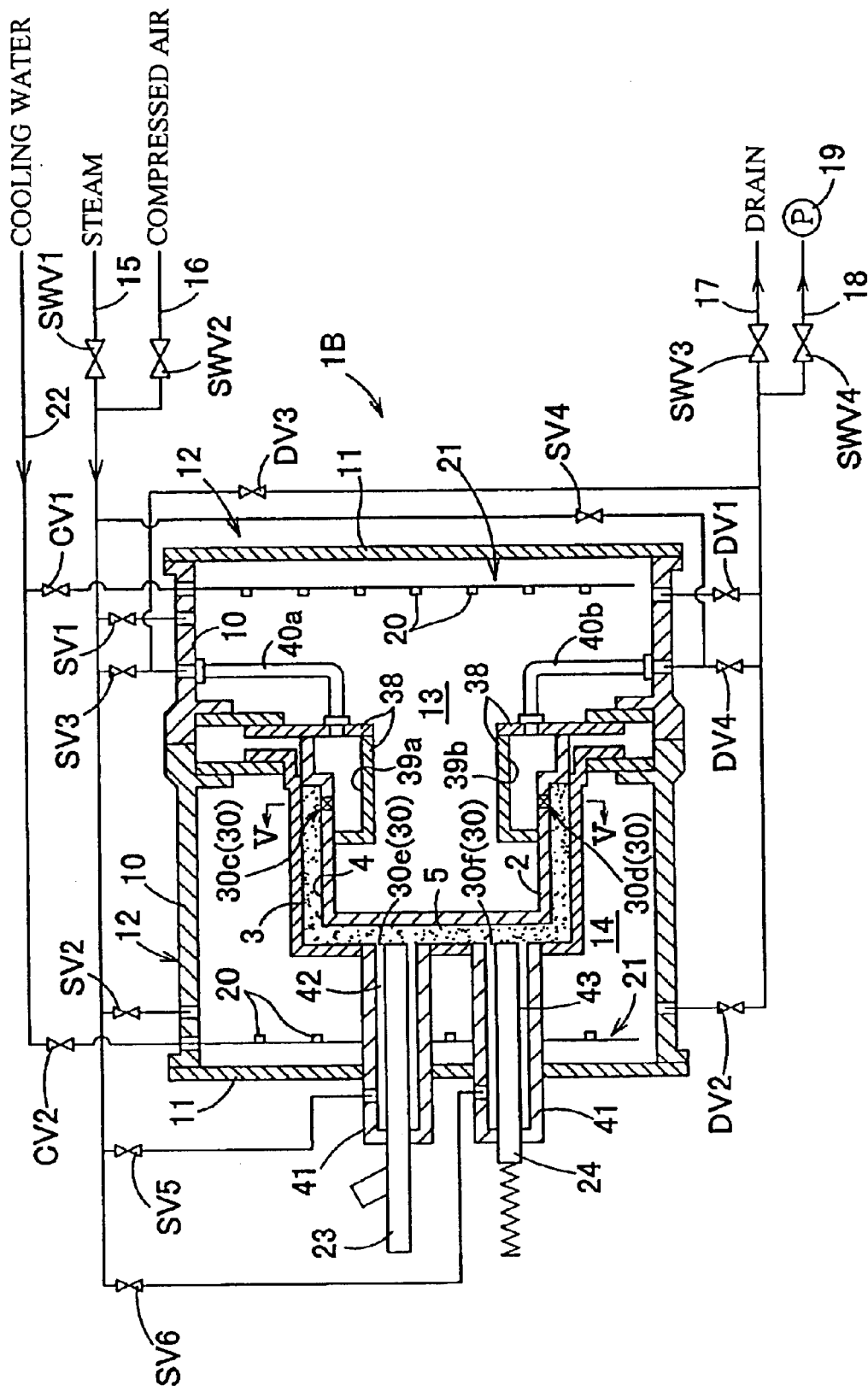
FIG. 4 is a general structural drawing of a die-expanded molded foaming apparatus having another configuration.
Figure 5:
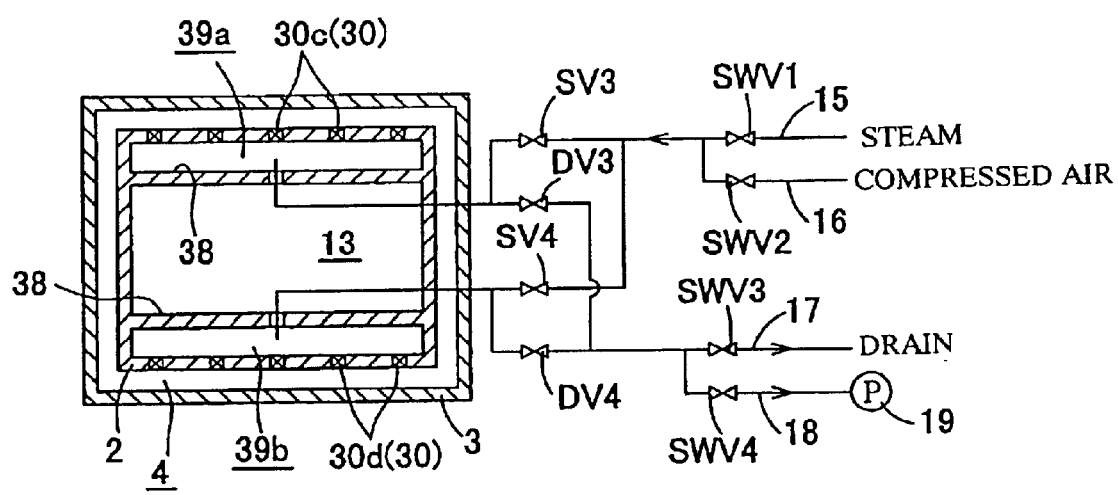
FIG. 5 is a V—V cross-sectional view of FIG. 4.

(3) In the third type die-expanded molded foaming apparatus 1B, as shown in FIG. 4 and FIG. 5, the first openings 30c and 30d opening to the cavity 4 are formed in the core die 2 near the joint of the core die 2 and the cavity die 3, connecting spaces 39a and 39b made of the passage formation element 38 fixed inside the core die so as to surround the first openings 30c and 30d and the internal pipes 40a and 40b for connecting the connecting spaces 39a and 39b to the external utility pipes 15~18 are disposed, as connecting passages for connecting the first openings 30c and 30d to the external utility pipes 15~18, so that the utility fluid can be supplied or exhausted independently to the first openings 30c and 30d via the connecting spaces 39a and 39b and the internal pipes 40a and 40b. Since the other structure is the same as the die-expanded molded foaming apparatus 1, identical parts are denoted by the same reference characters for which a detailed description is omitted.

In the die-expanded molded foaming apparatus 1B, conventional vent holes for connecting the cavity 4 and the chambers 12 and 13 are not formed in the dies 2 and 3, and when the dies are closed, the cavity 4 is formed air tightly isolated from the chambers 12 and 13, and the first openings 30c and 30d and the connecting passages for connecting these first openings 30c and 30d to the utility pipes 15~18, that is, the connecting spaces 39a and 39b and the internal pipes 40a and 40b, are formed in a mode different from the above two cases.

For the first openings 30c and 30d, through holes or slits may be formed directly in the core die 2, but in this case, the inner surface may be worn out by the passing steam, so it is preferable to form core vent attachment holes corresponding to the first openings 30c and 30d and to attach removable core vents just like a conventional molded foaming apparatus.

In accordance with the molded foaming apparatus 1B shown in FIG. 4 and FIG. 5, the utility fluid can be operated during molding, just like the die-expanded molded foaming apparatus 1, therefore the above mentioned advantages, (5) and (6), are also available here. Since the core vents for connecting the cavity 4 and the connecting spaces 39a and 39b are formed, the above mentioned advantages, (1)~(4), are not available, but the number of the core vents can be much less because the core vents are not formed uniformly on the entire surface of the dies as conventional types. Also the abrasion of the first openings 30c and 30d by steam can be easily prevented, which makes design more practical. In this third type molded foaming apparatus 1B as well, it is possible to form inter-die spaces between the joints of the left and right frames 10, just like the second type molded foaming apparatus, omitting the internal pipes 32a and 32b.

In the case shown in FIG. 4, the first openings 30c and 30d are formed at the core die 2 side, but if the inner surface side (core die 2 side) of the molded foam product is exposed to the outside, it is preferable to form the first openings 30c and 30d at the cavity die 3 side in terms of improving the beauty of the molded foam product.

Now the case when the first openings 30 are formed near the accessory parts, such as the filling unit 23 and the ejector pin 24, will be explained.

When the first openings 30 are formed near the accessory parts, as shown in FIG. 1, FIG. 3 and FIG. 4, outer elements 41 having roughly a cylindrical shape are fixed at positions which correspond to the filling unit 23 and the ejector pin 24 of the cavity die 3, the filling unit 23 and the ejector pin 24 are inserted and set in the outer elements 41, the connecting passages 42 and 43 for independently connecting to the utility pipes 15~18 are formed among the filling unit 23, the ejector pin 24 and the outer elements 41, the first openings 30e and 30f opening to the cavity 4 are formed at the tip of the connecting passages 42 and 43 respectively, and the utility pipes 15~15 are connected to the connecting passages 42 and 43 via the utility valves SV5 and SV6, so as to supply required steam and pressurizing air or to carry out the pressure reducing operation, just like the case of the above mentioned first openings 30a~30d.

In this case, the object of the present invention can be achieved by disposing the first openings 30e and 30f alone without disposing the first openings 30a~30d, but it is preferable to dispose the first openings 30a~30d as well.

It is also preferable to dispose the first openings 30e and 30f near the tip of the filling unit 23 and the ejector pin 24 along with the above described first openings 30a~30d, as shown in FIG. 1, FIG. 3 and FIG. 4, and form independent passages connecting the respective first openings 30 to the external utility pipes 15~18. In this case, the first opening 30 which can supply utility fluid is disposed to at least three locations, which is at both opposing ends of the cavity 4 and at the center part of the cavity 4, therefore utility fluid can be supplied as the demanded quality and the flexibility of control operation expands, such as to supply and stop utility fluid, and as a consequence, an optimum utility operation is carried out according to the type and shape of the molded foam body.

In the case shown in FIG. 1, FIG. 3 and FIG. 4, the first openings 30e and 30f are disposed near the tip of the filling unit 23 and the ejector pin 24, but the present invention is not restricted by this mode, and it is also possible to use other accessory parts which are attachable to the dies, such as the cooling water pipe fitting. As long as steam is supplied uniformly into all the material beads 5 in the cavity 4, it is unnecessary to form the connecting passages 42 and 43 outside the filling unit 23 and the ejector 24, and one or both of the first openings 30e and 30f can be omitted, where the first openings 30e and 30f are formed appropriately according to e.g. the shape of the molded foam product to be molded. The first openings 30a~30d may be formed as dedicated openings for exhausting steam supplied from the first openings 30e and 30f to the cavity 4. In FIG. 1, FIG. 3 and FIG. 4, the filling unit 23 and the ejector pin 24 are formed at the cavity die 3 side, but if the outer surface side (cavity die 3 side) of the molded foam product is exposed to the outside, it is preferable to dispose the filling unit 23 and the ejector pin 24 at the core die 2 side in terms of improving the beauty of the molded foam product.

In addition to the above mentioned first openings 30, it is preferable to form the second openings 50 in a portion of the dies 2 and 3 where the flow of the utility fluid becomes non-uniform in the cavity 4, and the connecting passages for connecting the second openings 50 and the external utility pipes 15~18 are disposed so as to supply or exhaust the utility fluid.

Figure 6:
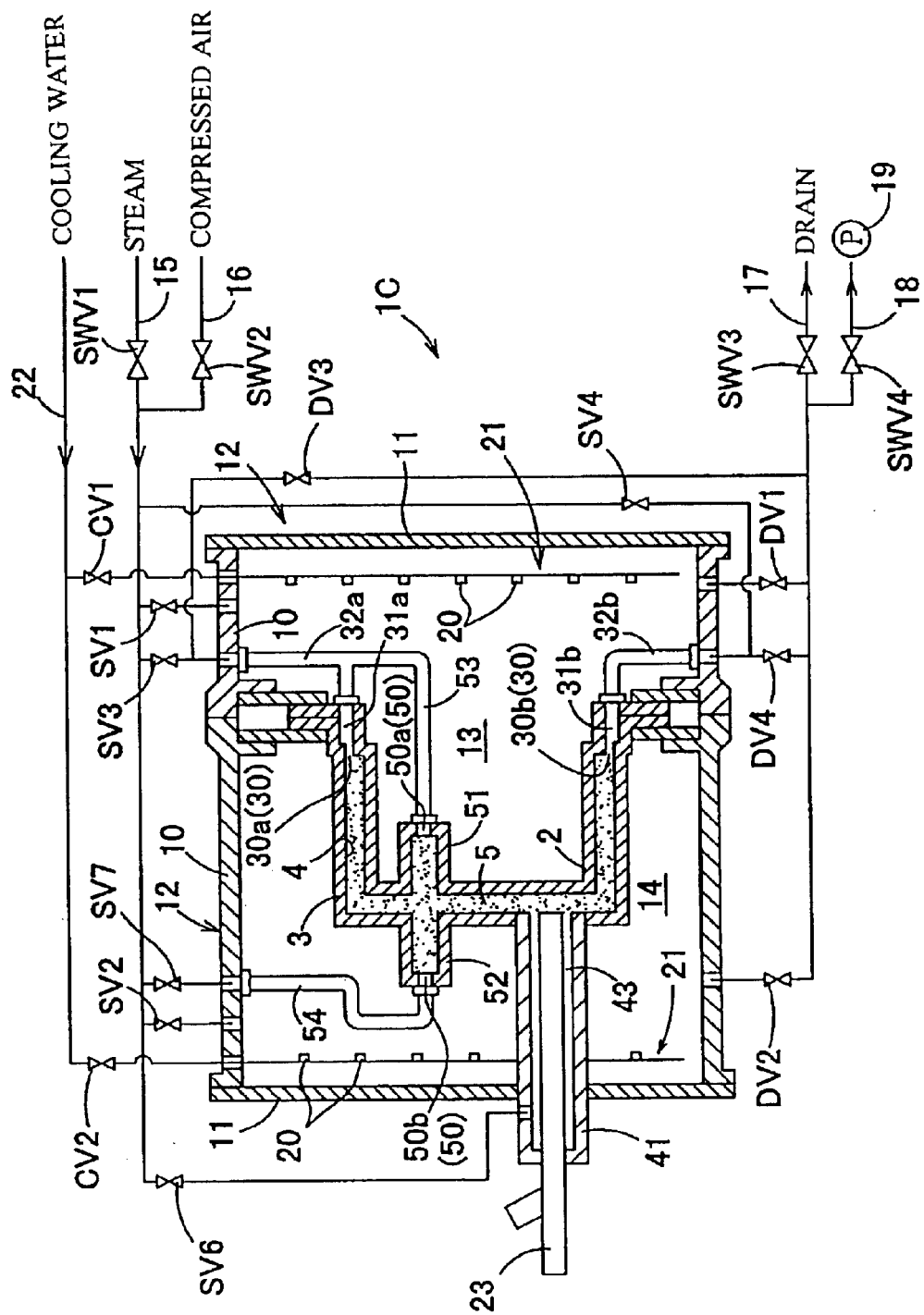
FIG. 6 is a general structural drawing of a die-expanded molded foaming apparatus having another configuration.
Figure 7:
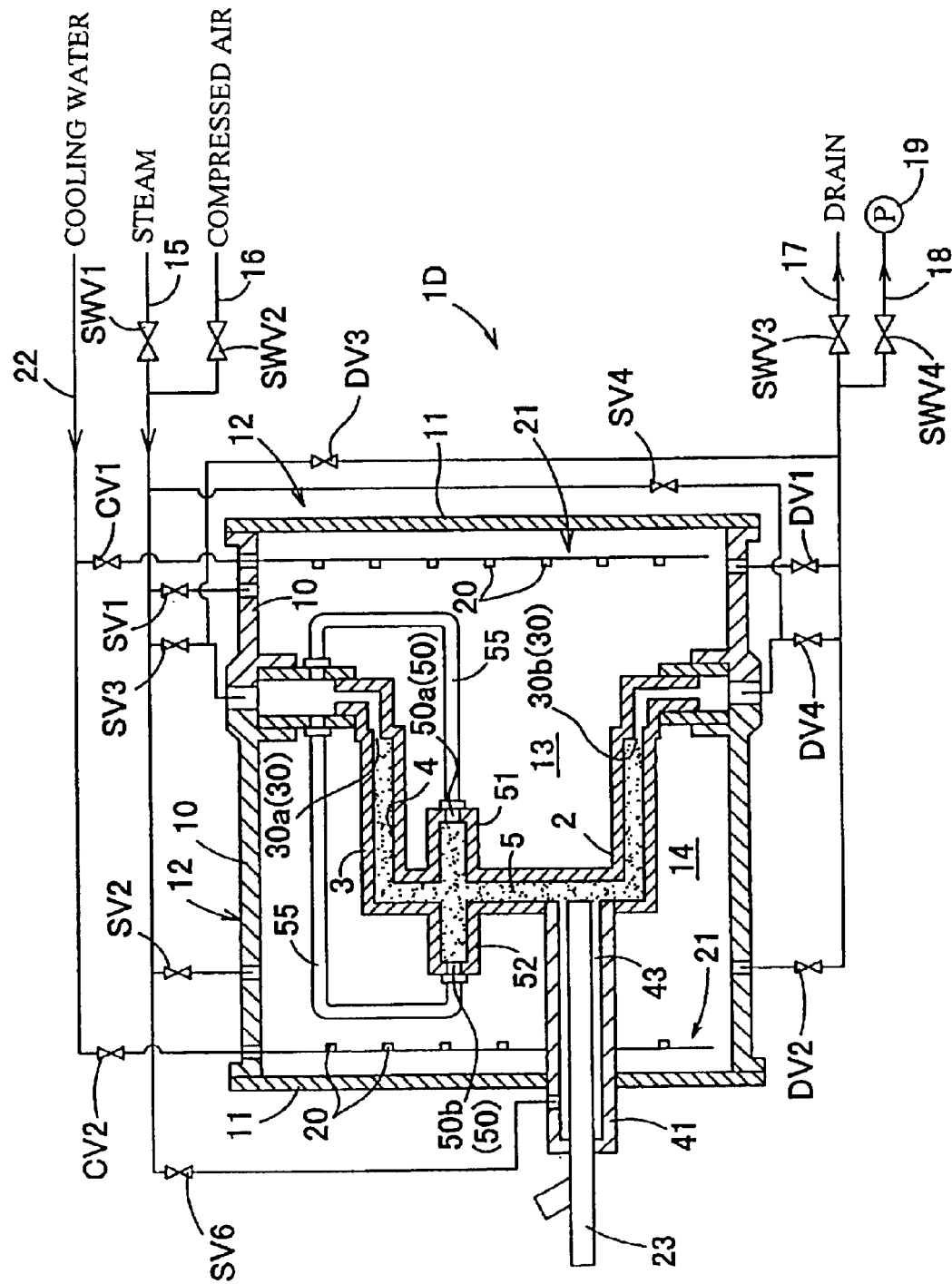
FIG. 7 is a general structural drawing of a die-expanded molded foaming apparatus having another configuration.
Figure 8:
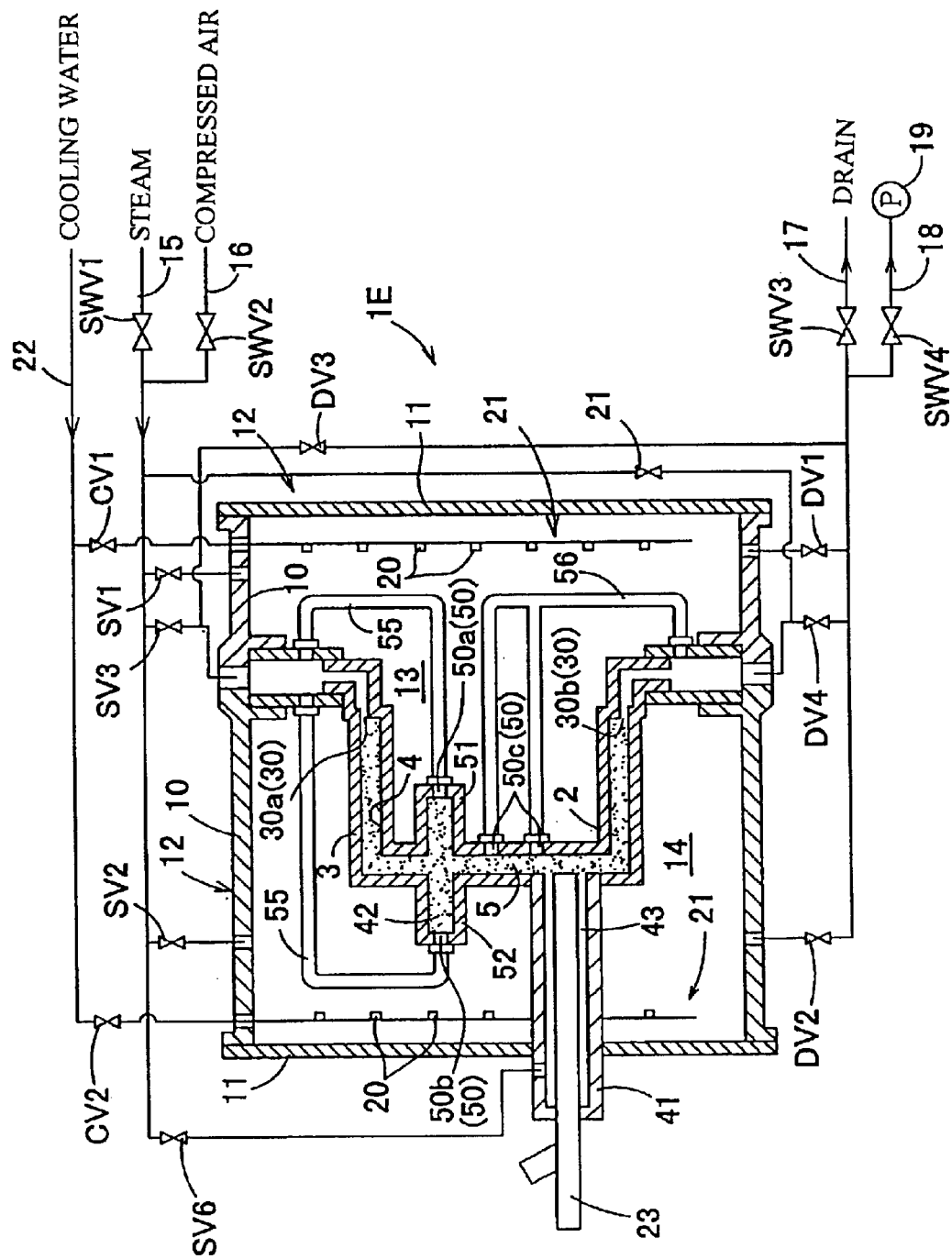
FIG. 8 is a general structural drawing of a die-expanded molded foaming apparatus having another configuration.

Portions where the flow of the utility fluid become non-uniform are, for example, the inner parts of concave areas 51 and 52 when the concave areas 51 and 52 are formed in the dies 2 and 3, as shown in FIG. 6~FIG. 8, and the center portion of the dies 2 and 3, as shown in FIG. 8, but there may be other portions as well.

The second openings 50 can be point shaped similar to conventional core vents or slit shaped having some length, but in either case, the width of the opening at the cavity 4 side must be the outer diameter size or less of a material bead 5 to be filled, so that the opening is not clogged by the material bead 5.

(1) When the second openings 50 are formed in the concave portions 51 and 52, the second openings 50a and 50b opening to the inner parts of the concave areas 51 and 52 are formed, as shown in the die-expanded molded foaming apparatus 1C in FIG. 6, where the second opening 50a is connected to the internal pipe 32a via the internal pipe 53, and the second opening 50b is connected to the independent internal pipe 54 and to the utility pipes 15~18 via the utility valve SV7. The second openings 50a and 50b may be connected to the utility pipes 15~18 via the internal pipes 32a and 32b, or may be directly connected to the utility pipes 15~18.

Since the second openings 50a and 50b independently connected to the external utility pipes 15~18 are formed in the inner parts of the concave areas 51 and 52 where the flow of the utility fluid become non-uniform, such utility operations as the supply of steam, supply of compressed air, and exhaust for vacuuming the cavity 4, or the adjustment of pressure in the cavity 4 and discharge of draining from the cavity 4, can be carried out independently via the second openings 50a and 50b according to the requirement, just like the cases of the above first openings 30a and 30b, therefore the non-uniformity of the utility fluid can be solved.

In accordance with the die-expanded molded foaming apparatus 1C, as the configuration clearly shows, the following matters become possible using the first openings 30a and 30b and the second openings 50a and 50b, instead of the conventional vent holes, in the molded foaming method where the above mentioned pre-expanded material beads 5 are filled in the cavity 4, pressure is reduced and exhausted, the beads are heated, expanded, and fused by the heating steam, then cooled down and solidified, and are taken out as a molded foam body made of the predetermined expandable synthetic resin.

For example, at exhausting with reducing pressure, after pressure inside the cavity 4 is directly reduced by exhausting with reducing pressure from one or both of the first openings 30a and 30b, and steam for preheating is then directly supplied in the same manner, and at this time, if necessary, non-uniformity of the utility fluid in the concave areas 51 and 52 can be solved by using the second openings 50a and 50b.

For heating and fusing, steam at fusing temperature can be directly supplied to the material beads 5 in the chamber 4 from one or both of the first openings 30a and 30b in the same manner, and steam is supplied to the concave areas 51 and 52 using the second openings 50a and 50b in the same manner so as to heat the portions where heat cannot easily reach merely by steam from the first openings 30a and 30b. In this case, it is needless to say that all of dies 2 and 3 can be heated from the rear faces by supplying the required steam from the chambers 13 and 14 if necessary.

When the second openings 50a and 50b are formed in the molded foaming apparatus 1A shown in FIG. 3, the internal pipes 55 for connecting the second openings 50a and 50b and the inter-die spaces 34a are disposed as shown in the die-expanded molded foaming apparatus 1D in FIG. 7, for example. In this case, at least one of the internal pipes 55 may be connected to the utility pipes 15~18 independently via the utility valve, not illustrated here.

In accordance with this embodiment, in addition to the above mentioned advantages, molding operation time can be decreased because at heating or cooling for molding, the inter-die passages 33a and 33b, which are parts of the dies 2 and 3 where heat capacity is relatively large, and the peripheral area of the inter-die spaces 34a and 34b, can be heated or cooled efficiently.

(2) In order to prevent a non-uniform flow of the utility fluid at the center part of the dies 2 and 3, the second openings 50c are formed in the part where flow becomes non-uniform, so as to connect to the inter-die spaces via the internal pipe 56, or to connect to the internal pipes 32a and 32b, or to connect to the utility pipes 15~18 via the utility valves, as shown in the die-expanded molded forming apparatus 1E shown in FIG. 8.

A non-uniform flow of the utility fluid is apt to occur when the space between the openings 30 and 50 for supplying or exhausting the utility fluid becomes 100 mm or more, so when a pair of the first openings 30a and 30b are disposed at the opposing positions of the peripheral area, sandwiching the cavity 4, and the space between the first openings 30a and 30b is 100 mm or more, as shown in FIG. 2, the second opening 50c may be formed at the intermediate position of the first openings 30a and 30b, as shown in FIG. 8. It is also preferable to form the second openings 50 such that the distance between the first opening 30 and the second opening 50 and the distance between the second openings 50 become 100 mm or less.

In accordance with this die-expanded molded foaming apparatus 1E, where a pair of the first openings 30a and 30b are formed opposite each other, sandwiching the cavity 4, utility operation to supply such a utility fluid as steam from one of the first openings to the other first opening through the cavity, can be adopted, and particularly, operation for substituting air among the material beads 5 filled in the cavity 4 with steam and the operation for heating the material beads 5 quickly become possible.

Also the required number of second openings 50 are formed at a maximum of 100 mm spacing, which helps make the flow of the utility fluid smooth, preventing an uneven flow and uneven velocity of the utility fluid to be generated in the cavity 4. As a consequence, even if the flat portion at the center of the cavity has a shape with a high length/thickness ratio, 20 or more for example, density non-uniformity and foaming non-uniformity in the flat portion at the center can be controlled.

Now a method for die-expanded molded foaming of a molded foam product using the above molded foaming apparatus 1 shown in FIG. 9 will be explained. In the following description, the material beads are made of polystyrene unless otherwise specified, but the present invention can be applied just as well even if material beads made of polyolefine synthetic resin material are used. For the molded foaming apparatuses 1A~1E, the method for molding is basically the same, so only the differences from the case of using the molded foaming apparatus 1 will be described.

Figure 9:
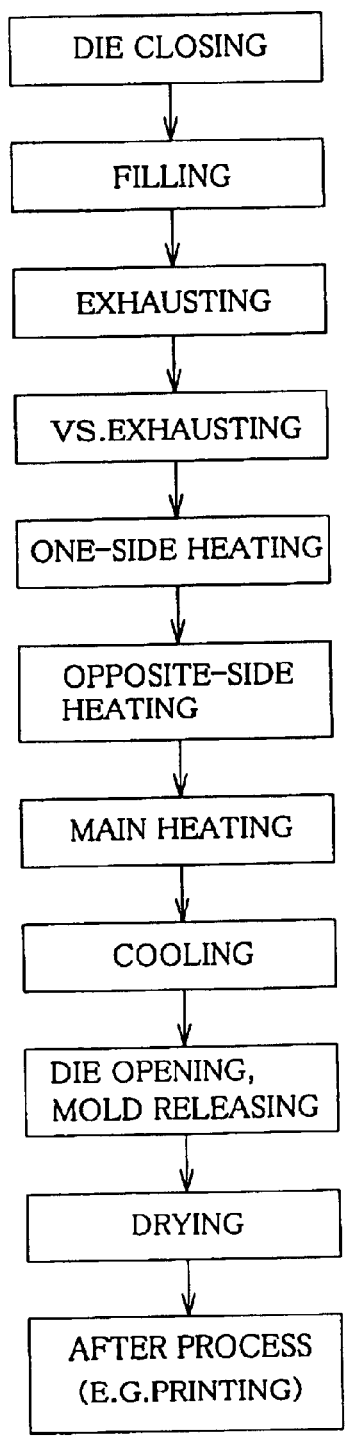
FIG. 9 is a process drawing depicting a method for die-expanded molded foaming.
Figure 9:
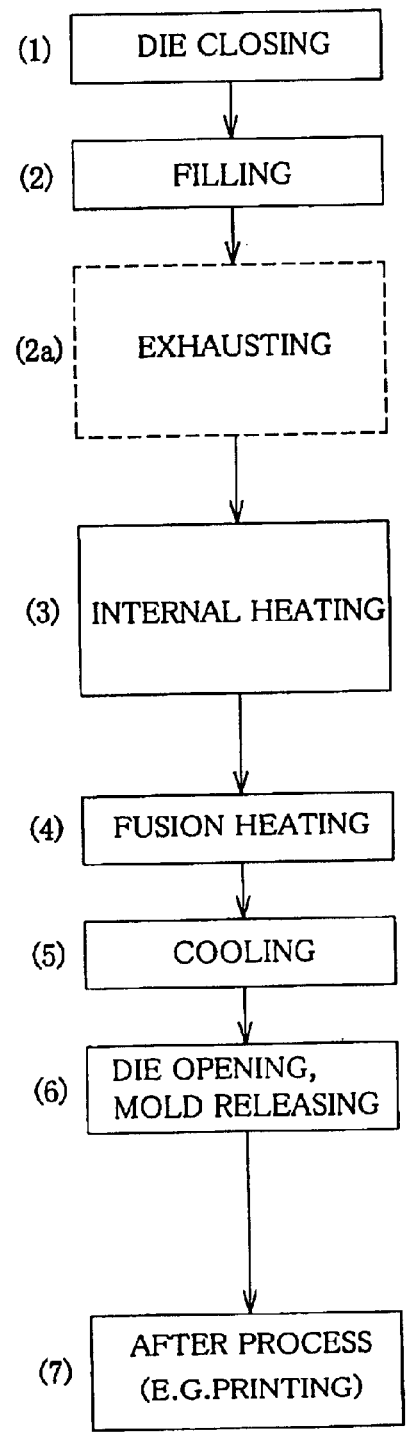

FIG. 9 shows the processes of the method for molded foaming of the present invention comparing with a conventional process shown at the left. The method for molded foaming of the present invention is carried out in the sequence of 1) die closing, 2) filling, 3) internal heating, 4) fusion heating, 5) cooling, 6) opening and releasing, and 7) after process, such as printing.

The content of each process will be explained below.

(1) Die Closing Process

The core die 2 and the cavity die 3 are closed. This forms the cavity 4 between the core die 2 and the cavity die 3, which is air tightly isolated from the chambers 13 and 14, and the first openings 30 connecting to the utility pipes 15~18. In the molded foaming apparatus 1, the slit shaped first openings 30a and 30b are formed along the joint of the dies 2 and 3, and the first openings 30a and 30b are connected to the utility pipes 15~18 via the connection passages, that is, the inter-die passages 31a and 31b and the internal pipes 32a and 32b.

(2) Filling Process

In the filling process, pressure in the cavity 4 Is maintained to a minus pressure with respect to the pressure in the material tank, which is not illustrated, and the material beads in the material tank are supplied from the filling unit 23 to the cavity 4 and are filled in the cavity 4 by the differential pressure between the material tank and the cavity 4 using a part or all of the first openings 30.

Concretely, the material beads are supplied to the cavity while maintaining the pressure in the material tank at a predetermined pressure which is at the atmospheric pressure or higher, more preferably a predetermined atmospheric pressure in a ~5.0 kg/cm² range, or even more preferably in a 0.1~5.0 kg/cm² range, and maintaining the pressure in the cavity 4 at a pressurized state which is at the atmospheric pressure or more and less than 0.5 kg/cm² minus the pressure in the material tank.

The reason for maintaining the pressure in the material tank at a predetermined atmospheric pressure in a ~5.0 kg/cm² range, more preferably in a 0.1~5.0 kg/cm² range, is that the material beads in the cavity in this range are compressed and capacity is decreased to an optimum diameter (capacity), and filling density becomes relatively uniform in the plane portions, the side face portions or even in the narrow portions of the cavity, which is preferable.

The reason to create a differential pressure less than the pressure in the material tank minus 0.5 kg/cm² while maintaining the pressure in the cavity 4 at the atmospheric pressure or higher is that in the pressure state outside this range, the flow velocity of carrier air flow becomes excessive, and clogging of the material beads occur in the cavity 4 or in a narrow portion of the filling passage, which is not preferable.

The pressure inside the material tank may be set based on the pressure in the cavity 4. Concretely, the pressure in the cavity 4 is set at a predetermined pressure which is the atmospheric pressure or higher, more preferably 0.1~5.0 kg/cm², and inside the tank is pressured in the range less than the pressure in the cavity plus 0.5 kg/cm², so as to fill the material beads by the differential pressure.

Another preferable filling method is supplying the material beads to the cavity 4 with maintaining the pressure in the cavity 4 in a pressure reduced state from the atmospheric pressure to an atmospheric pressure minus 1.0 kg/cm² range, while keeping the pressure in the material tank in an atmospheric pressure ~5.0 kg/cm² range.

An advantage in maintaining the pressure in the cavity 4 at a negative pressure in the atmospheric pressure to a minus 1.0 kg/cm² range while keeping the pressure in the material tank in an atmospheric pressure ~5.0 kg/cm² range is that it is easy to maintain a negative pressure state during filling for the material beads which do not require compression and capacity reduction. Since only the pressure in the cavity 4 is reduced, filling density in the plane portions, the side face portions and even in the narrow portions of the cavity 4 become uniform, which is preferable.

Such a filling method also has the following additional advantages.

1) For filling, the supplied material beads flow from the filling unit 23 located at about the center of the cavity 4 to the direction of the first openings 30*a* and 30*b* disposed at the side edge of the cavity 4, therefore filling unevenness does not occur very much in the cavity 4 and the quality of products stabilizes.

2) Since the material beads are filled in a compressed state, spaces among particles of the material beads can be decreased and the operation for substituting air with steam during the heating for expansion, which is carried out next, becomes easier.

3) In the pressure adjustment operation during filing, the target is limited to the cavity 4, and conventional pressure adjustment for large capacity, including the chambers 13 and 14 at both sides, is unnecessary, which makes adjustment space ¹⁄₂₀ or less, decreases the load of pressuring and pressure reducing apparatuses considerably, and makes these apparatuses compact.

The feature of this filling process is that the cavity 4 and the chambers 13 and 14 can be filled independently, which allows heating the dies 2 and 3 up to a temperature where the material beads do not fuse by supplying the heating steam into the chambers 13 and 14 while filling the material beads into the cavity 4. In this case, heating steam, that is, saturated steam at 0.2 kg/cm² (terminal temperature: 104° C.), is used for about five seconds.

When the molded foaming apparatus enters from the closing process to the filling process, the temperature drops considerably because time has passed since the previous heating operation, therefore it is preferable to preheat the dies preparing for the expansion operation in the after process even when molding is continuously performed, but in a conventional filling process, where air for filling the material beads is exhausted from the cavity via the chamber, the dies cannot be preheated in this filling process stage. Whereas in the present invention, where the exhaust passages for air for filling is independent from the chambers 13 and 14, preheating can be operated in parallel, separately from the filling operation.

This filling process completes in approximately five seconds, and in this stage, it is sufficient to raise the surface temperature of the dies 2 and 3 to 97~100° C. Since the object of preheating here is to let each part of the dies reach a uniform temperature as much as possible as the prestage for the expanding or fusing operation, it is important not to raise the temperature to a level where the material beads expand and fuse.

In the case of the molded foaming apparatuses 1C~1E, the pressure of the second openings is adjusted to be a predetermined minus pressure with respect to the pressure in the material tank, inter-locking with the above mentioned pressure adjustment operation for the cavity 4 by the first openings 30 or prior to the pressure adjustment operation for the cavity 4 by the first openings 30, so as to adjust the flow of the material beads in the portion where the flow of the material beads is apt to be disturbed and to solve filling unevenness.

(2a) Returning-to-atmosphere process or exhaust process

Since the material beads in the cavity 4 are filled in a pressurized and compressed state and the percentage of voids drops to approximately 40% by the above filling process, it is not really necessary for the present invention to use the returning-to-atmosphere process or a conventional exhaust process here, but such a process may be used if necessary.

The returning-to-atmosphere process here is a process for releasing the cavity 4 in a pressurized state during filling to atmospheric pressure, and during this operation, the pressurized and compressed particles of the material beads expand as the pressure reduces, filling the spaces among the particles, so the percentage of void decreases from 40% to 5~20%, decreasing the residual air content in the voids among particles which would cause problems with fusion in the after process, and uniformity inside the molded foam body is improved.

The exhaust process here is a process for actively exhausting the air inside by reducing the pressure in the cavity 4 so as to decrease the percentage of the void and of the residual air content, but this operation for exhausting is normally unnecessary because the percentage of the void and the residual air content have already reached a rather low level by the returning-to-atmosphere process or the cavity 4 of the present invention is not connected to the chamber 13 or the chamber 14 which have large capacities and residual air can be easily exhausted in the prestage of the later mentioned internal heating process.

(3) Internal Heating Process

When filling and preheating of the material beads in the filling process complete, the internal heating process, which is the next process, may begin. This is a process for heating the filled material beads up to a temperature just before fusion by releasing the heating steam at a temperature less than the fusion temperature of the material beads to the cavity 4 via the connecting passages, by supplying from the first opening 30$a$ and releasing from the first opening 30$b$, for example, and generating condensed water on the surfaces of the dies 2 and 3 enclosing the cavity 4.

In this process, it is necessary to increase the temperature of the material beads in advance, but it is important not to supply steam having a temperature higher than the fusion temperature, since uniform heating is interrupted during heating in the after process if fusion of the material beads occurs, even partially, in this stage. Also in this stage, it is necessary for the supplied saturated steam to contact the dies 2 and 3, which are the outer walls of the cavity 4, to be cooled down and to generate some condensed water on the surfaces of the dies, therefore it is important to supply steam having a temperature which is cooled down a few degrees by the dies 2 and 3. In this case, steam at 104~109° C. (steam pressure: 0.2~0.4 kg/cm$^2$) is preferable, and the time required for this process is approximately 2~5 seconds.

(4) Fusion Heating Process

When the above preparations are completed, heating steam having a temperature which is a fusion temperature of the material beads or higher is suddenly supplied into the chambers 13 and 14, heat is conducted into the cavity 4, the above mentioned condensed water is evaporated into steam at high temperature, and is instantaneously infiltrated into the particles of the material beads so as to progress the expansion and fusion of the material beads. In this case, 109~120° C. (steam pressure: 0.4~1.0 kg/cm$^2$) is suitable for the temperature of the heating steam.

The means for heating by evaporating the condensed water in the cavity 4 into steam at high temperature is used in this process because fusion among the material beads can be promoted while preventing non-uniform fusion by using steam which easily infiltrates into the material beads.

Time required for achieving the purpose of the fusion heating process is very short, approximately fifteen seconds. Although the present invention is an indirect heating type, the time required for the fusion heating process is not so different from the case of a conventional method, twelve seconds, because preheating is possible in the filling process, the percentage of void in material beads can be decreased, and condensed water is utilized in the internal heating process.

(5) Cooling Process

To cool and solidify the fused molded foam body, a method similar to a conventional method is used. After spraying cooling water from the cooling water pipe disposed in the chamber, so as to cool the molded foam body to some degree, moisture is evaporated by reducing the pressure inside to consume the latent heat, and as a result, the internal temperature is effectively decreased. Concretely, the cooling water valves CV1 and CV2 are opened and the cooling water is sprayed from the nozzle 24 to the core die 2 and the cavity die 3 so that the molded foam product in the cavity 4 is cooled down via the core die 2 and the cavity die 3.

Time required for this cooling process is approximately fifty seconds, whereas it takes approximately 100 seconds conventionally. This is because the heating temperature itself can be kept low, and the cavity is sealed and temperature of the dies can be decreased by effectively using the cooling water.

(6) Die Opening and Mold Releasing Process

When the molded foam body solidifies and the temperature drops to a temperature where a predetermined shape can be maintained, the dies 2 and 3 are opened by moving the core die 2 in FIG. 2 in the right direction, and the molded foam body is pushed out in the right direction by the eject pin attached to the cavity die 3 at the left, for example, to take out the molded foam body. In this case, the releasing of the molded foam body becomes easier if compressed air is supplied from the first openings 30$e$ and 30$f$ formed near the filling unit 23 and the eject pin 24.

(7) After Process

After mold releasing, an after process according to the specifications, such as a printing process, a labeling process or a packaging process is set, and in the case of the present invention, a drying process, which is necessary for a conventional method, can be omitted since the cooling water sprayed in the cooling process does not enter the cavity, and the moisture content of an obtained molded foam body is 4% or less, whereas in a conventional method this is 6~10%. In this aspect as well, the present invention can greatly contribute to the improvement of productivity.

Now another embodiment where the processes in the above die-expanded molded foaming method are partially changed will be explained.

In the above mentioned molded foaming method where condensed water is generated in the cavity 4 in the internal heating process, heating steam is supplied to the chambers 13 and 14 for indirectly heating inside the cavity in the fusion heating process, so as to evaporate the condensed water in the cavity 4 to steam at high temperature and to heat, expand and fuse the material beads by this steam at high temperature, but instead of the internal heating process and the fusion heating process, the following fusion heating process may be adopted where heating steam is directly supplied to the cavity 4 through the first openings 30 and the second openings 50 for heating, expanding and fusing the material beads. For the other processes, which are the same as the above embodiment, description is omitted.

First the utility valves SV1 and SV2 are opened in a state where the drain valves DV1 and DV2 are open, and steam is supplied to the chambers 13 and 14 so as to substitute air in the chambers 13 and 14 with steam. This process may be carried out in the filling process.

Then the drain valves DV1 and DV2 are closed, and at the same time, steam is supplied to the chambers 13 and 14 for a predetermined heating time while controlling the utility valves SV1 and SV2 so that the inside of the chambers 13 and 14 become a predetermined steam pressure, where the core die 2 and the cavity die 3 are heated, and the material beads 5 contacting the core die 2 and the cavity die 3 are expanded and fused to mold the surface portion of the molded foam product.

A process for heating the material beads filled in the cavity 4 is carried out in parallel, and this process is roughly divided into three steps.

In the first step, the drain valve D4 is opened while the drain valve DV3 is closed, and the utility valves SV3, SV5 and SV6 are opened while the utility valve SV4 is closed, so that steam is supplied to the cavity 4 to substitute the air among the material beads with steam.

In the second step, the drain valve DV4 is closed while the drain valve DV3 is opened, and the utility valve SV3 is closed while the utility valves SV4, SV5 and SV6 are opened, which is the opposite of the first step, so that steam is supplied to the cavity 4 to substitute the air among the material beads with steam. The second step, however, may be omitted.

In the third step, the drain valves DV3 and DV4 are closed, and steam is supplied to the cavity 4 for a predetermined heating time, while controlling the utility valves SV3~SV6 so that the inside of the cavity 4 becomes a predetermined steam pressure, where the material beads are heated, expanded and fused to mold inside the molded foam product.

Since the surface portion of the molded foam product and inside the molded foam product can be independently heated by the steam to be supplied to the chambers 13 and 14 and the steam to be supplied to the cavity 4, it is possible to adjust the surface property of the molded foam product and the internal fusion rate of the molded foam product independently.

In accordance with the fusion heating process with such a configuration, the heating of the surface portion and heating inside the molded foam product can be carried out independently, therefore in the case of a molded foam product for which mechanical strength is not a major requirement, for example, the cycle time of molding can be decreased by keeping the internal fusion rate of the molded foam product low while maintaining sufficient surface property, and as a result, both productivity and commercial value can be implemented.

Figure 10:
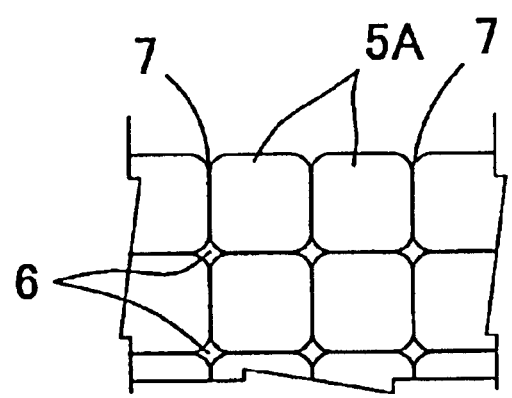
FIG. 10 is a drawing depicting the surface property and internal fusion rate of a molded foam product.
Figure 10:
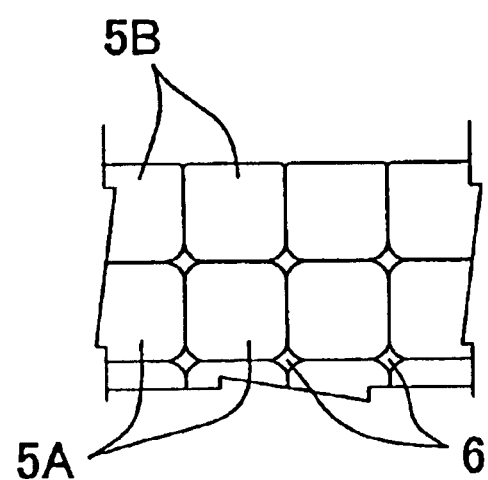
Figure 11:
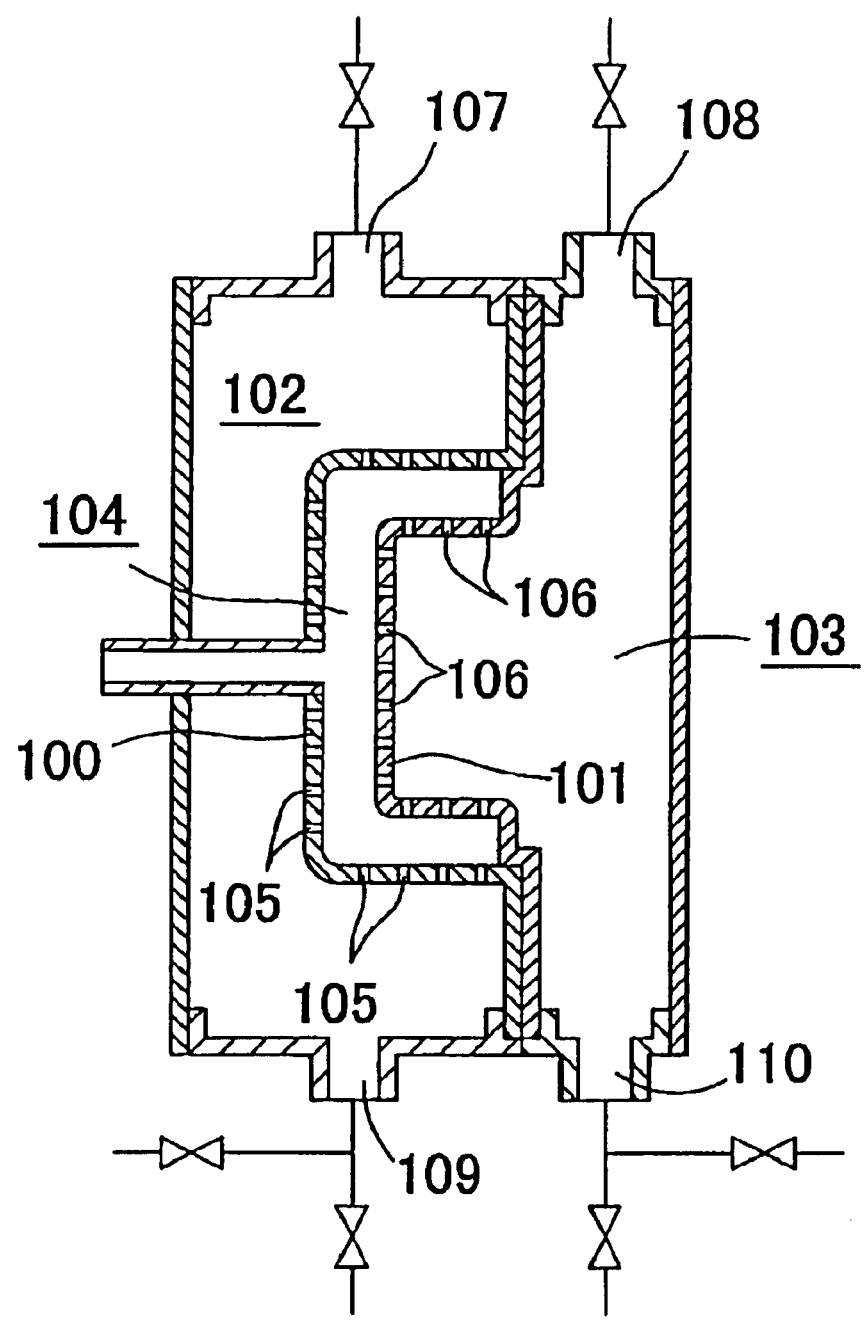
Figure 12:
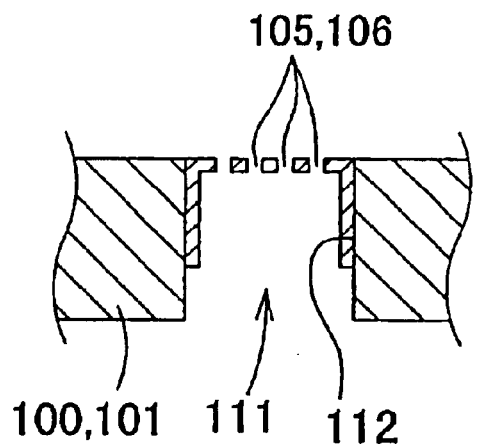
Figure 13:
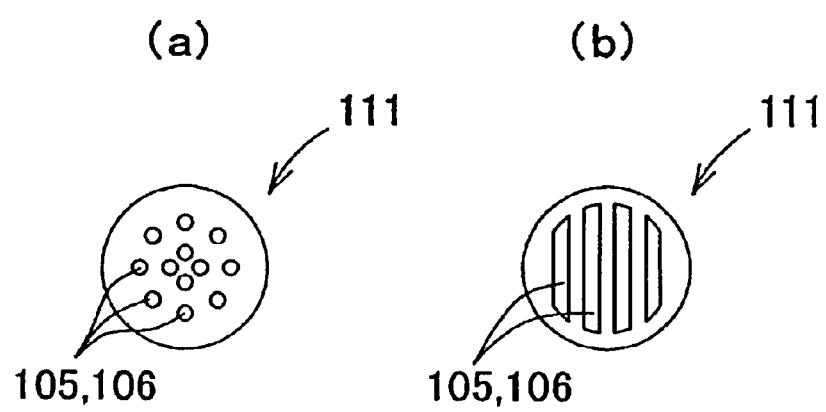
Figure 14:
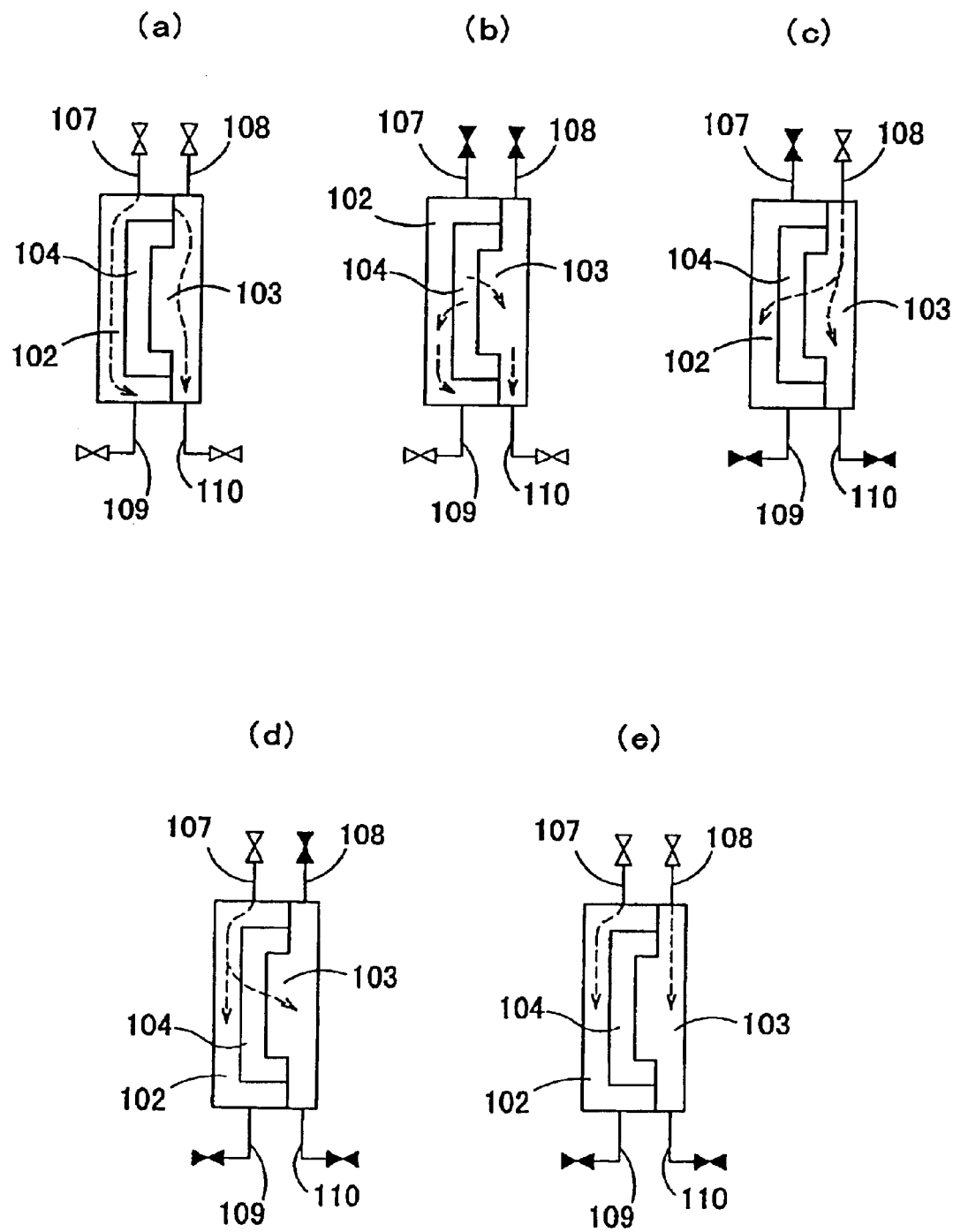

The molded foam product molded in this manner becomes a molded foam product with a beautiful surface free from traces of core vents and core vent holes on the outer surface. In this molded foam product, the surface property can be set equivalent to an equal heating molded foam product manufactured based on conventional molding technology, whereas the internal fusion rate can be set lower or higher than that of the equal heating molded foam product with the above surface property. In other words, in the case of the conventional molding method, where the surface and the inside of the material beads are heated under the same conditions during the heating, expanding and fusing of the material beads, if the internal fusion rate of the molded foam product is set low, gaps 6 are formed at the boundaries of the beads 5A inside the molded foam product, and dents 7 are formed on the surface portion of the molded foam product, as shown in FIG. 10(a), whereas in the case of the molding method according to the present invention where the surface and the inside can be heated independently, only the internal fusion rate can be set low so that a beautiful molded foam product having a smooth surface with almost no dents 7 at the boundaries of the beads 5B on the surface of the molded foam product can be implemented, although gaps 6 are formed at the boundaries of the beads 5A inside the molded foam product, as shown in FIG. 10(b). Setting the internal fusion rate low can be suitably applied to molded foam products for which high surface property is demanded but mechanical strength is not a major requirement, such as a decorative form for the surface of concrete, or the cover of a container and heat insulating material, and setting the internal fusion rate high can be suitably applied to molded foam products for which surface property is not a major requirement but high mechanical strength is, or for molded foam products which can withstand repeated use, such as molded foam products for various components for automobiles and returnable containers. The present invention is more effective and useful for relatively large molded foam products with a complicated shape, rather than for small molded foam products with a simple shape, such as a container for instant noodles packaged in a cup. The present invention is particularly useful for a molded foam product having both thick and thin wall portions.

Now the evaluation tests for the molded foaming method, including the fusion heating process according to another embodiment described above, and the quality evaluation test for the molded foam products manufactured thereby will be explained.

We molded material beads made of polypropylene under the heating conditions shown in Table 1, and measured the surface property and internal fusion rate of the molded foam products.

The surface property here was evaluated in five rankings according to the frequency of occurrence of dents 7 shown in FIG. 10(a), where the higher value indicates better surface property with less frequency of occurrence of dents 7. The fusion rate was based on the evaluation of beads status in the cross-section when the molded foam product is split, and more concretely, the ratio of broken beads determined by measurement, regarding a bead as not fused when the bead itself is not broken but has a crack along its surface, and regarding a bead as fused when the bead itself is broken.

TABLE 1

| Heating condition $kg/cm^2$ | | Quality of molded foam product | | Molding | |
|---|---|---|---|---|---|
| Utility chambers 13, 14 | Cavity 4 | Surface property | Fusion rate % | cycle sec. | Case |
| 3.0 | 2.5 | 2 | 10 | 130 | A |
|  | 3.0 | 2 | 50 | 210 | B |
|  | 3.5 | 2 | 80 | 240 | C |
| 3.5 | 2.5 | 3 | 10 | 150 | D |
|  | 3.0 | 3 | 50 | 220 | E |
|  | 3.5 | 3 | 80 | 250 | F |
| 4.0 | 2.5 | 4 | 10 | 170 | G |
|  | 3.0 | 4 | 50 | 230 | H |
|  | 3.5 | 4 | 80 | 260 | I |

As the result shows, the surface property and the internal fusion rate of a molded foam product can be independently controlled by controlling the heating conditions for the chambers 13 and 14 and the heating conditions for the cavity 4 by steam from the first openings 30a and 30b. With the conventional molding method, only molded foam products with a quality corresponding to cases B and F in Table 1 can be manufactured, but with the present invention, molded foam products corresponding to cases A~I, can be manufactured with various combinations of surface properties and fusion rates, and flexibility of molding considerably expands.

For example, a molded foam product having good surface property with a low internal fusion rate, as shown in cases D and G, can be manufactured. In such molded foam products, mechanical strength is low since the internal fusion rate is low, but the heating, expanding and fusing time and the cooling time can be decreased, and productivity can be increased while maintaining good surface property, therefore these molded foam products can be suitably used for molded foam products for which mechanical strength is not a major requirement, such as a decorative frame for the surface of concrete, or the cover of a container and heat insulating material. In order to manufacture such a molded foam product using the conventional molding method, 250 sec. or more of cycle time of molding is required as case F shows, if products with a surface property evaluated at 3 or higher are regarded as non-defective, but with the molding method of the present invention, such a product can be molded at 150 sec., 220 sec., 170 sec. and 230 sec. of cycle time respectively as cases D, E, G and H show, therefore productivity increases. Also the energy cost can be decreased since heating more than necessary is not carried out.

Also, molded foam products where the internal fusion rate is set high and the surface property is set somewhat low, as shown in case C, can be manufactured. In such molded foam products, mechanical strength is high since the internal fusion rate is high, but expanding and fusing time and cooling time can be decreased, steam pressure in the first openings 30a and 30b can be set low, and productivity is improved and energy is saved while sufficiently increasing the mechanical strength, therefore these molded foam products can be suitably used for molded foam products for which surface property is not a major requirement but mechanical strength is, such as molded foam products for various components for automobiles and returnable containers. In order to manufacture such a molded foam product using the conventional molding method, 250 sec. or more of cycle time of molding is required, as case F shows, if products with a fusion rate of 80 are regarded as non-defective, but with the molding method of the present invention, such a product can be molded with 240 sec. of cycle time, as case C shows, therefore productivity increases. Also energy cost can be decreased by lowering the steam pressure in the chambers 13 and 14, since steam pressure in the chambers 13 and 14 can be set at 3.5 kg/cm$^2$ for case F, whereas 3.0 kg/cm$^2$ for case C.

In accordance with the method for filling material beads according to the first aspect, the chambers and the cavity are air tightly isolated, that is, a molded foaming apparatus to be used does not have vent holes for connecting the chambers and the cavity in the dies, therefore the problems caused when forming the vent holes can be fundamentally solved. Filling the material beads, which utilizes differential pressure between the material tank and the cavity, can be easily carried out by adjusting the pressure of the material tank and the cavity.

If the material beads are supplied to the cavity while maintaining the pressure in the material tank in an atmospheric pressure ~5.0 kg/cm$^2$ range, as described in the second aspect, filling density becomes relatively uniform in the plane portions, the side face portions or even in the narrow portions of the cavity, by compressing and decreasing the capacity of the material beads in the cavity to be an optimum outer diameter (capacity).

If the pressure in the cavity is maintained to be a pressured state, which is an atmospheric pressure more and less than minus 0.5 kg/cm$^2$ with respect to the pressure in the material tank, as described in the third aspect, the material beads can be filled uniformly into the cavity or narrow portions of the filling passages by setting the flow velocity of the carrier air flow to be optimum, which is preferable.

If the pressure in the cavity is maintained in a reduced pressure state, which is from the atmospheric pressure to a minus 1.0 kg/cm$^2$, as described in the fourth aspect, pressure only in the cavity is reduced for the material beads which do not need compression and decreasing capacity, so it is easy to maintain a negative pressure state during filling, and filling density becomes uniform in the plane portions or the side face portions or even in the narrow portions of the cavity, which is preferable.

In accordance with the method for die-expanded molded foaming of synthetic resin according to the sixth aspect, just like the filling method according to the first aspect, the chambers and the cavity are air tightly isolated, that is, the molded foaming apparatus to be used does not have vent holes for connecting the chambers and the cavity in the dies, and steam and air are supplied to or exhausted from the cavity, not through vent holes but through utility passages directly connected to the cavity, therefore the above mentioned problems caused when forming the vent holes can be fundamentally solved.

Since the material beads are filled by a filling method according to one of the first to fifth aspects in the filling process, filling can easily be uniform by adjusting the pressure of the material tank and the cavity.

Also the utility field can be supplied to the cavity and the chambers independently, therefore preheating of the dies can be operated with supplying heating steam to the chambers separately from the filling operation, which is preferable.

In accordance with the method for die-expanded molded foaming according to claim 7, the core vent attachment holes can be completely eliminated, therefore the manufacturing cost can be decreased by constituting the dies thin, and control accuracy of such utility fluid as steam can be improved. Since the operation for forming core vent attachment holes and the operation for attaching core vents are decreased or eliminated, productivity of the dies can be improved, and the maintenance operation required for the clogging of vent holes by scales can be decreased or eliminated. The openings formed at such positions do not drop beauty in appearance of the molded foam product, and such utility fluid as steam can be supplied to the cavity uniformly, which is preferable.

If the accessory part is the material beads filling unit, as described in the eighth aspect, a drop in appearance of the molded foam product can be prevented since traces of the openings are not outstanding.

If the returning-to-atmosphere process for releasing the inside of the cavity from a pressurized state to an atmospheric pressure state or for the exhaust process for reducing the pressure inside the cavity and exhausting the air inside is added between the filling process and the internal heating process, as described in the ninth aspect, the residual air content in the voids among particles, which will be a problem during fusion in the after process, is decreased and the uniformity inside the molded foam body is improved.

In accordance with the method for die-expanded molded foaming of synthetic resin according to the tenth aspect, steam can be supplied to the pair of chambers and the cavity independently, and the heating conditions for the respective spaces can be adjusted independently, which makes it possible to decrease the cycle time of molding while keeping the internal fusion rate of the molded foam product low, and to manufacture molded foam products with a beautiful surface as well, and consequently both productivity and commercial value can be implemented.

Since the chambers and the cavity are formed in an air tightly isolated state, heating conditions for these three spaces can be more accurately set, and the above mentioned problems caused when forming vent holes can be fundamentally solved.

If the internal fusion rate is controlled at will with maintaining the surface property of the molded foam product while independently controlling the heating conditions for the pair of chambers and the cavity, as described in the eleventh aspect, the surface property of one surface and the surface property of the other surface of the molded foam product contacting the set of the dies can be controlled independently, which is preferable.

If the steam pressure and time are controlled as the heating conditions, as described in the twelfth aspect, conventional steam equipment which has been used at a factory can be used, and equipment for control can be constructed at low cost, which is preferable.

If the material beads are polyolefine synthetic resin material, as described in the thirteenth aspect, filling property can be improved since the material itself is soft and has high gas permeability, which makes it much easier to change the shape of particles than material beads made of polystyrene synthetic resin material having the same expansion ratio.

In accordance with the die-expanded molded foam product according to the fourteenth aspect, the molded foam product has a beautiful surface free from traces of core vents and core vent holes, therefore clean printing is possible on the outer surface, which is preferable. Such molded foam products can be easily manufactured by a molding method according to one of the tenth thirteen aspects.

If the internal fusion rate is lower than an equal heating molded foam product having the same surface property setting as described in the fifteenth aspect, heating, expanding and fusing time during molding and cooling time can be decreased, and productivity can be improved by decreasing the cycle time for molding. Also both productivity and commercial value can be implemented since the surface property can be sufficiently maintained while setting the internal fusion rate low, without dropping commercial value.

If the internal fusion rate is higher than an equal heating molded foam product having the same surface property setting, as described in the sixteenth aspect, the mechanical strength of the molded foam product becomes higher, which is suitable when only strength is required, and surface property of the molded foam product is not. Such a molded foam product has a higher mechanical strength since the internal fusion rate is higher than an equal heating molded foam product having the same surface property setting, and when this molded foam product is manufactured by a molding method according to the tenth aspect, heating steam pressure in the heating process can be set high only for the cavity, and therefore the amount of steam to be used is less than the case of molding an equal heating molded foam product, and energy can be saved.

What is claimed is:

1. A method for die-expanded molded foaming of synthetic resin comprising the steps of:

filling material beads in a cavity enclosed within a pair of dies with chambers disposed on the rear sides respectively; heating, expanding and fusing the material beads to be a molded foam body; and cooling, releasing and taking out the molded foam body from the dies, wherein the following processes are included:

a) a die closing process where the dies are closed to form said cavity air tightly isolated from said chambers, and to form utility passages independent from the chambers and directly connected to the cavity;

b) a filling process where the material beads are supplied and filled into the cavity from a material tank while maintaining the pressure in the cavity at a predetermined pressure lower than the pressure in said material tank, at the same time heating steam is supplied to said chambers so as to heat the entire dies around the chambers to a temperature where the material beads do not expand;

c) an internal heating process where heating steam having a temperature less than the fusing temperature of the material beads is supplied to said cavity through said utility passages so as to heat the filled material beads, and at the same time, form condensed water on the faces of the dies enclosing the cavity; and d) a fusion heating process where heating steam having a temperature at the fusion temperature of the material beads or higher is supplied to said chamber, so as to evaporate the condensed water in said cavity and to progress expansion and fusion of the material beads.

2. A method for die-expanded molded foaming of synthetic resin, wherein a cavity is formed enclosed with a pair of dies with chambers disposed on the rear sides respectively, and is air tightly isolated from said chambers, then the material beads are supplied to said cavity while maintaining the pressure in said cavity to a predetermined pressure lower than the pressure in a material tank; and wherein heating conditions for said chambers and said cavity are controlled, thereby the material beads filled in the cavity are heated, expanded and fused while controlling the internal fusion rate at will with maintaining the surface property of the molded foam product, and said heating conditions in said cavity are controlled through utility passages means independent from said chambers.

3. The method for die-expanded molded foam of synthetic resin according to claim 1 or 2, wherein the material beads are supplied to the cavity while maintaining the pressure in said material tank at a pressure from atmosphere pressure to 5.0 kg/cm$^2$.

4. The method for die-expanded molded foaming of synthetic resin according to claim 3, wherein the pressure in said cavity is maintained at a pressure of at least atmospheric pressure and lower than the pressure in the material tank by 0.5 kg/cm$^2$ or less.

5. The method for die-expanded molded foaming of synthetic resin according to claim 3, wherein the pressure in said cavity is maintained at a reduced pressure from atmospheric pressure to minus 1.0 kg/cm$^2$.

6. The method for die-expanded molded foaming of synthetic resin according to claim 1 or 2, wherein the pressure in said cavity is from 5.0 kg/cm$^2$ to minus 1.0 kg/cm$^2$.

7. The method for die-expanded molded foaming of synthetic resin according to claim 1, wherein in said die closing process, said utility passages are slit shaped openings opening to the cavity formed along an accessory part to be attached to at least one of the dies and/or formed along the joint of said pair of dies and being of a width not more than the outer diameter size of a material bead to be filled, and connect to passages to external utility pipes.

8. The method for die-expanded molded foaming of synthetic resin according to claim 7, wherein said accessory part is a filling unit of material beads or an ejector pin.

9. The method for die-expanded molded foaming of synthetic resin according to claim 1, wherein a returning-to-atmosphere process for releasing the inside of said cavity from the pressurized state to an atmospheric pressure state or an exhaust process for reducing pressure inside said cavity to exhaust internal air is added between said filling process and the internal heating process.

10. The method for die-expanded molded foaming of synthetic resin according to claim 2, wherein the internal fusion rate is controlled at will with maintaining the surface property of the molded foam product while independently controlling the heating conditions for the pair of chambers and the cavity.

11. The method for die-expanded molded foaming of synthetic resin according to claim 10, wherein the steam pressure and time are controlled as heating conditions.

12. The method for die-expanded molded foaming of synthetic resin according to claim 1 or 2, wherein the material beads are polyolefin synthetic resin material heating the surface and the inside under the same heating conditions.

13. A method for filling material beads from a material tank to a cavity comprised of a set of dies, wherein the cavity is formed enclosed with a pair of dies with chambers disposed on the rear sides respectively, and is air tightly isolated from said chambers, then the material beads are supplied to said cavity while maintaining the pressure in the material tank at a pressure from atmospheric pressure to 5.0 kg/cm$^2$, and, through utility passage means independent from said chambers, maintaining the pressure in the cavity at a pressure of at least atmospheric pressure and less than the pressure in the material tank by 0.5 kg/cm$^2$ or less.

* * * * *